US005867587A

United States Patent [19]

Aboutalib et al.

[11] Patent Number: 5,867,587

[45] Date of Patent: Feb. 2, 1999

[54] IMPAIRED OPERATOR DETECTION AND WARNING SYSTEM EMPLOYING EYEBLINK ANALYSIS

[75] Inventors: Omar Aboutalib, Diamond Bar; Richard Roy Ramroth, Long Beach, both of Calif.

[73] Assignee: Northrop Grumman Corporation, Los Angeles, Calif.

[21] Appl. No.: 858,771

[22] Filed: May 19, 1997

[51] Int. Cl.[6] .................... G06K 9/00

[52] U.S. Cl. .................... 382/117; 382/291; 340/576; 351/209

[58] Field of Search .................... 382/115, 278, 382/116, 117, 291; 364/819, 820; 340/576, 573.7, 575, 439; 351/209, 210, 246

[56] References Cited

U.S. PATENT DOCUMENTS

| | | | |
|---|---|---|---|
| 4,492,952 | 1/1985 | Miller . | |
| 4,641,349 | 2/1987 | Flom et al. | 382/117 |
| 4,725,824 | 2/1988 | Yoshioka . | |
| 4,854,329 | 8/1989 | Walruff . | |
| 4,896,039 | 1/1990 | Fraden | 401/208 |
| 4,928,090 | 5/1990 | Yoshimi et al. . | |
| 4,953,111 | 8/1990 | Yamanoto et al. . | |
| 5,353,013 | 10/1994 | Estrada . | |
| 5,373,006 | 12/1994 | Shimotani et al. | 600/558 |
| 5,402,109 | 3/1995 | Mannik . | |
| 5,469,143 | 11/1995 | Cooper . | |
| 5,729,619 | 3/1998 | Puma | 382/115 |

*Primary Examiner*—Amelia Au
*Assistant Examiner*—Vikkram Bali
*Attorney, Agent, or Firm*—Terry J. Anderson; Karl J. Hoch, Jr.

[57] ABSTRACT

A system and method for detecting and warning of an impaired operator, such as a drowsy vehicle/machine operator or air traffic controller. The system and method employ an imaging apparatus which produces consecutive digital images including the face and eyes of an operator. There is an eye finding unit which determines the location of the operator's eyes within each digital image, and generates correlation coefficients corresponding to each eye which quantify the degree of correspondence between pixels associated with the location of the operator's eye in an immediately preceding image in comparison to pixels associated with the location of the operator's eye in a current image. An impaired operator detection unit is used to average the first N consecutive correlation coefficients generated to generate a first average correlation coefficient. After the production of each subsequent image by the imaging apparatus, the impaired operator detection unit averages the previous N consecutive correlation coefficients generated to create a next average correlation coefficient. Next, the impaired operator detection unit analyzes the average correlation coefficients associated with each eye to extract at least one parameter attributable to an eyeblink of the operator's eyes. These extracted parameters are compared to an alert operator threshold associated with that parameter. An impaired operator warning unit is used to indicate that the operator may be impaired if any extracted parameters deviate from the associated threshold in a prescribed way.

27 Claims, 15 Drawing Sheets

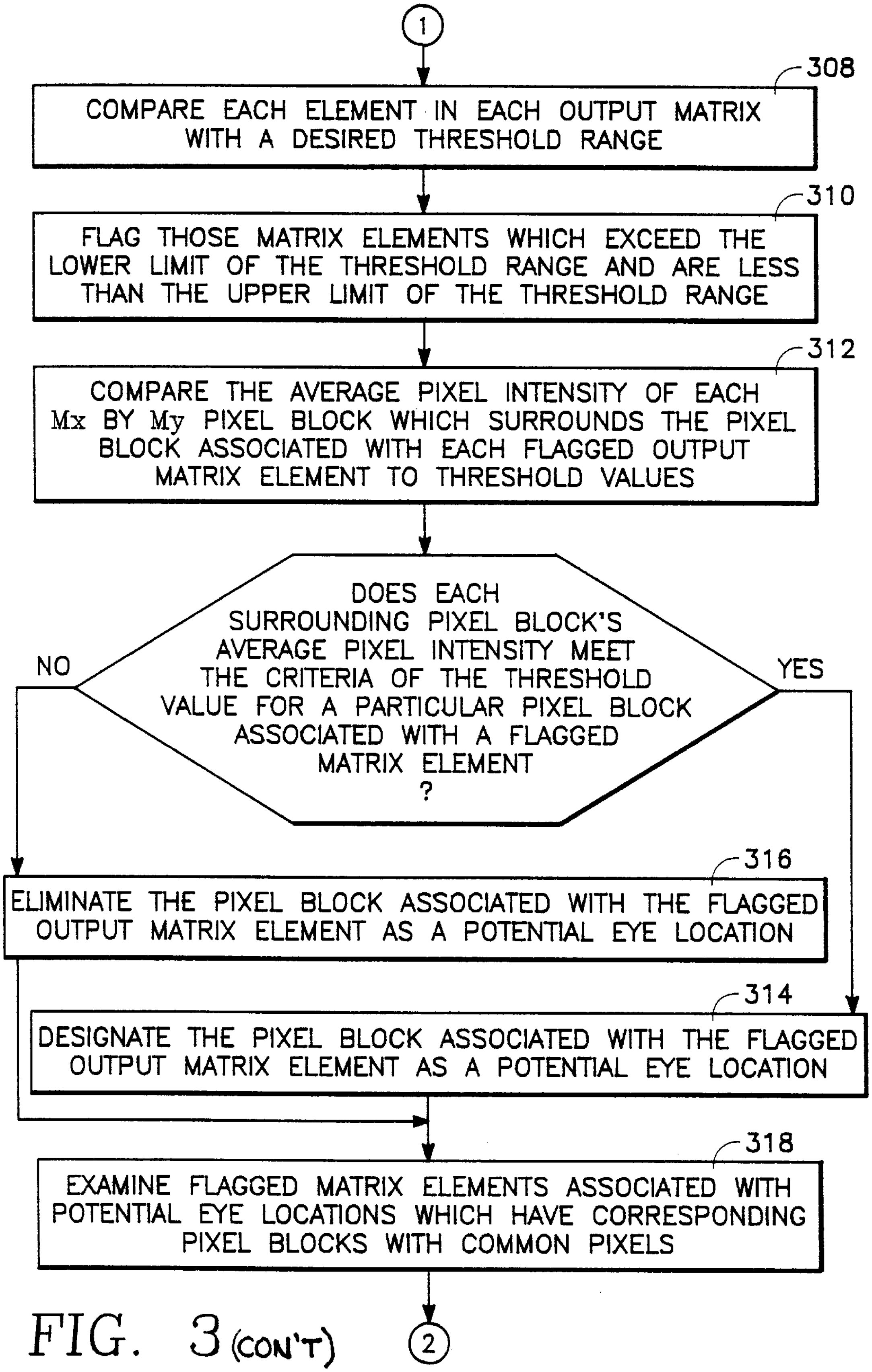
FIG. 3 (CON'T)

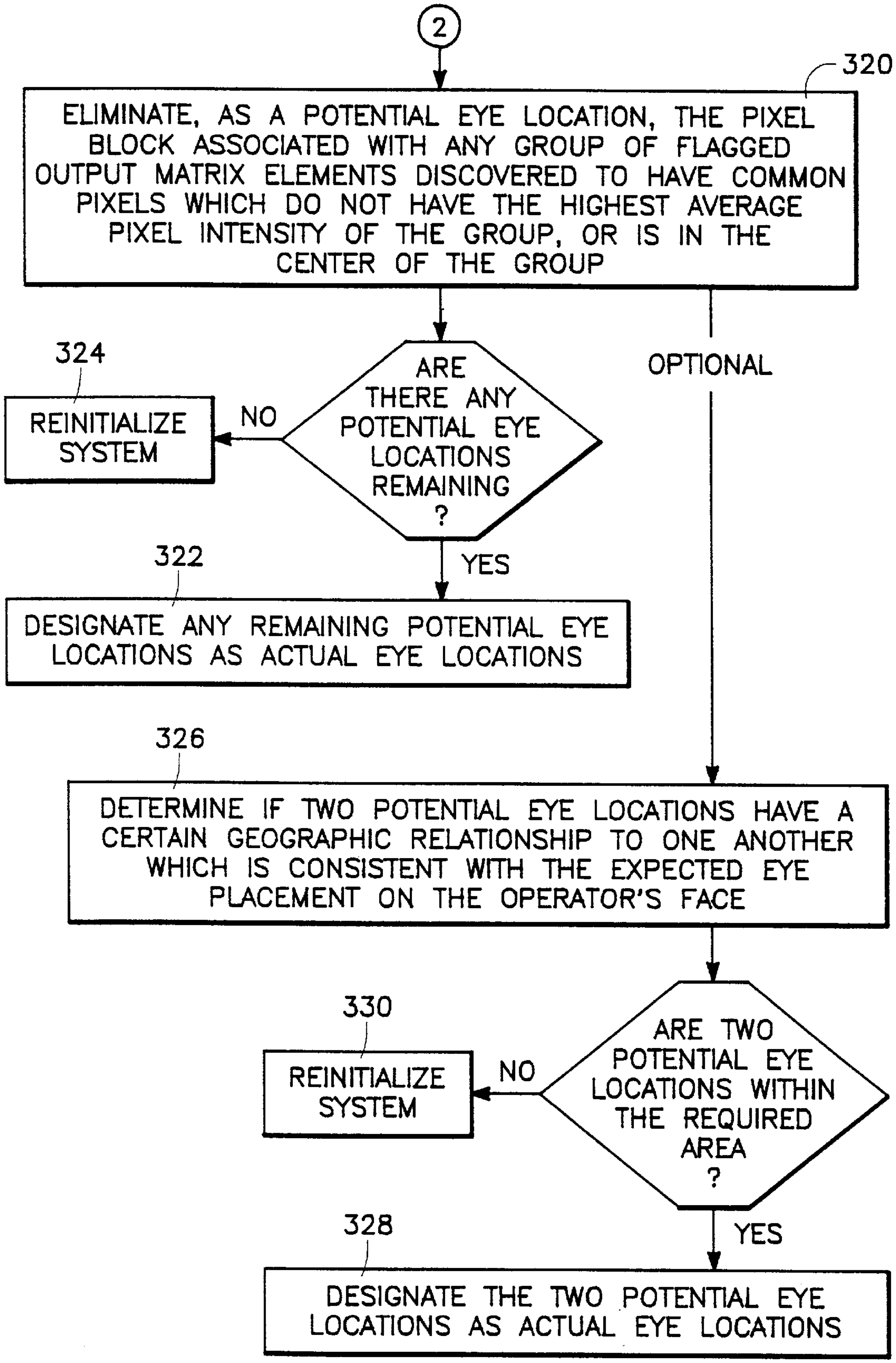
FIG. 3 (CON'T)

FIG. 5 (CON'T)

FIG. 7 (CON'T)

IMPAIRED OPERATOR DETECTION AND WARNING SYSTEM EMPLOYING EYEBLINK ANALYSIS

BACKGROUND

1. Technical Field

This invention relates to a system and method for detecting when an operator performing tasks which require alertness, such as a vehicle operator, air traffic controller, and the like, is impaired due to drowsiness, intoxication, or other physical or mental conditions. More particularly, the present invention employs an eyeblink analysis to accomplish this impaired operator detection. Further, this system and method includes provisions for providing a warning when an operator is determined to be impaired.

2. Background Art

Heretofore, a detection system employing an analysis of a blink of an operator's eye to determine impairedness has been proposed which uses a eyeblink waveform sensor. The sensor is of a conventional type, such as an electrode presumably attached near the operator's eye which produces electrical impulses whenever the operator blinks. Thus, the sensor produces a signal indicative an eyeblink. The proposed system records an eyeblink parameter pattern derived from the eyeblink waveform of an alert individual, and then monitors subsequent eyeblinks. Parameters derived from the eyeblink waveforms generated during the monitoring phase are compared to the recorded awake-state parameters, and an alarm signal is generated if an excessive deviation exists.

Another impaired operator detection system has been proposed which uses two illuminator and reflection sensor pairs. Essentially the eye of the operator is illuminated from two different directions by the illuminators. The sensors are used to detect reflection of the light from the illuminated eye. A blink is detected by analyzing the amount of light detected by each sensor. The number and duration of the detected blinks are used to determine whether the monitored operator is impaired.

Although these prior art systems may work for their intended purpose, it is a primary object of the present invention to provide an improved and more reliable impaired operator detection and warning system which can provide a determination of whether an operator is impaired on the basis of eyeblink characteristics and thereafter initiate an impaired operator warning with greater reliability and accuracy, and via less intrusive methods, than has been achieved in the past.

SUMMARY

The above-described objectives are realized with embodiments of the present invention directed to a system and method for detecting and warning of an impaired operator. The system and method employ an imaging apparatus which produces consecutive digital images including the face and eyes of an operator. Each of these digital images has an array of pixels representing the intensity of light reflected from the face of the subject. There is also an eye finding unit which determines the location of the operator's eyes within each digital image, and generates correlation coefficients corresponding to each eye. Each correlation coefficient quantifies the degree of correspondence between pixels associated with the location of the operator's eye in an immediately preceding image in comparison to pixels associated with the location of the operator's eye in a current image. The system and method employ an impaired operator detection unit to average the first N consecutive correlation coefficients generated to generate a first average correlation coefficient, where the N corresponds to at least the number of images required to image a blink of the operator's eyes. After the production of the next image by the imaging apparatus, the impaired operator detection unit averages the previous N consecutive correlation coefficients generated to create a next average correlation coefficient. This process is repeated for each image frame produced by the imaging apparatus. Next, the impaired operator detection unit analyzes the average correlation coefficients associated with each eye to extract at least one parameter attributable to an eyeblink of the operator's eyes. These extracted parameters are compared to an alert operator threshold associated with that parameter. This threshold is indicative of an alert operator. An impaired operator warning unit is used to indicate that the operator may be impaired if any extracted parameters deviate from the associated threshold in a prescribed way.

Preferably, the aforementioned analyzing step performed by the impaired operator detection unit includes extracting parameters indicative of one or more of the duration, frequency, and amplitude of an operator's eyeblinks. The subsequent comparing process can then include comparing an extracted duration parameter to an alert operator duration threshold which corresponds to a maximum eyeblink duration expected to be exhibited by an alert operator's eye, comparing an extracted frequency parameter to an alert operator frequency threshold which corresponds to a minimum eyeblink frequency expected to be exhibited by an alert operator's eye, and comparing an extracted amplitude parameter to an alert operator amplitude threshold which corresponds to a minimum eyeblink amplitude expected to be exhibited by an alert operator's eye. Further, the comparing process can include determining the difference between at least one of the extracted parameters associated with a first eye and a like extracted parameter associated with the other eye, to establish a consistency factor for the extracted parameter. Then, the established parameter consistency factor is compared to an alert operator consistency threshold associated with that parameter.

Preferably, the impaired operator warning unit operates such that an indication is made that the operator may be impaired whenever one or more of the following is determined:

(1) the extracted duration parameter exceeds the alert operator duration threshold;

(2) the extracted frequency parameter is less than the alert operator frequency threshold;

(3) the extracted amplitude parameter is less than the alert operator amplitude threshold; and (4) an established parameter consistency factor exceeds an associated alert operator consistency threshold.

The system and method can also involve the use of a corroborating operator alertness indicator unit which generates a corroborating indicator of operator impairedness whenever measured operator control inputs are indicative of the operator being impaired. If such a unit is employed, the impaired operator warning unit can be modified such that an indication is made that the operator is impaired whenever at least one of the extracted parameter deviates from the associated threshold in the prescribed way, and the corroborating indicator is generated.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
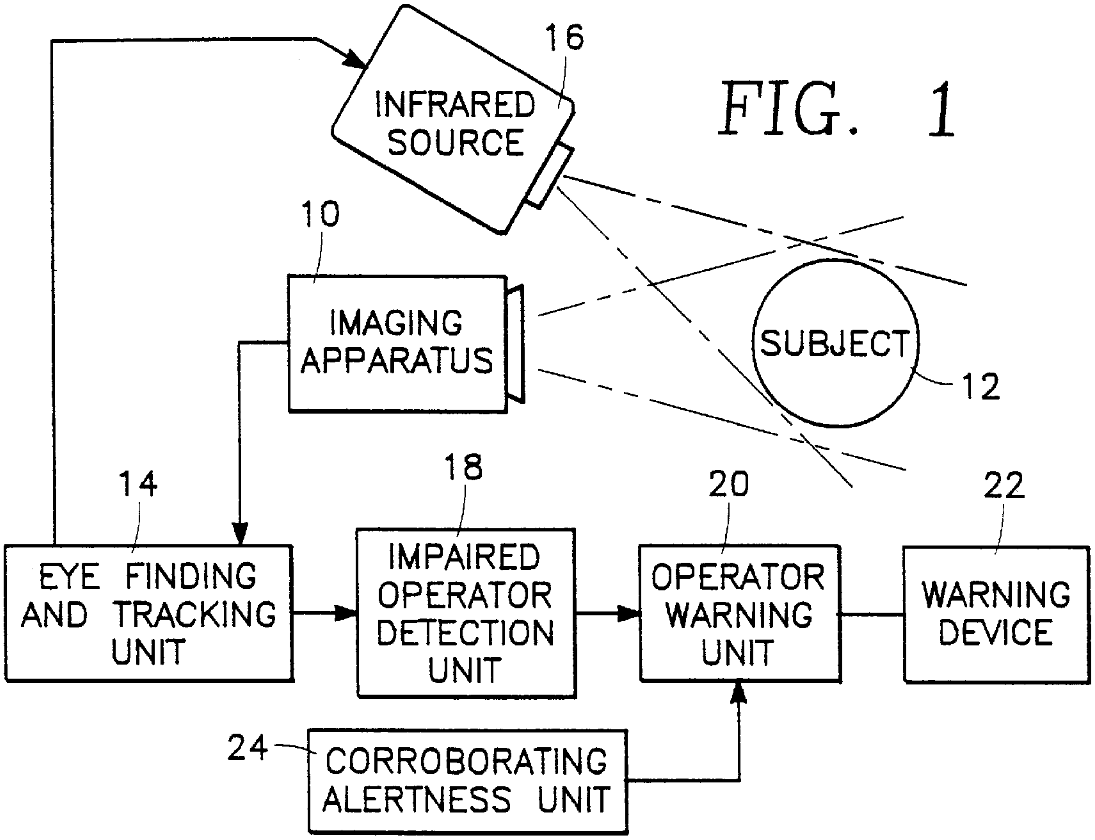
FIG. 1 is a schematic diagram showing one embodiment of an impaired operator detection and warning system in accordance with the present invention.

The present invention preferably employs at least a portion of the a unique eye finding and tracking system and method as disclosed in a co-pending application entitled EYE FINDING AND TRACKING SYSTEM, having the same inventors as the present application and assigned to a common assignee. This co-pending application was filed on May 19, 1997 and assigned Ser. No. 08/858,841. The disclosure of the co-pending application is hereby incorporated by reference. Generally, as shown in FIG. 1, this eye finding and tracking system involves the use of an imaging apparatus 10 which may be a digital camera, or a television camera connected to a frame grabber device as is known in the art. The imaging apparatus 10 is located in front of a subject 12, so as to image his or her face. Thus, the output of the imaging apparatus 10 is a signal representing digitized images of a subject's face. Preferably, the digitized images are provided at a rate of about 30 frames per second. Each frame preferably consists of an 640 by 480 array of pixels each having one of 256 (i.e. 0 to 255) gray tones representative of the intensity of reflected light from a portion of the subject's face. The output signal from the imaging apparatus is fed into an eye finding and tracking unit 14. The unit 14 processes each image frame produced by the imaging apparatus 10 to detect the position of the subject's eye and to track these eye positions over time. The eye finding and tracking unit 14 can employ a digital computer to accomplish the image processing task, or alternately, the processing could be performed by logic circuitry specifically designed for the task. Optionally, there can also be an infrared light source 16 positioned so as to illuminate the subject's face. The eye finding and tracking unit 14 would be used to control this light source 16. The infrared light source 16 is activated by the unit 14 whenever it is needed to effectively image the subject's face. Specifically, the light source would be activated to illuminate the subject's face at night or when the ambient lighting conditions are too low to obtain an image. The unit 14 includes a sensor capable of determining when the ambient lighting conditions are inadequate. In addition, the light source would be employed when the subject 12 is wearing non-reflective sunglasses, as these types of sunglasses are transparent to infrared light. The subject could indicate that sunglasses are being worn, such as by depressing a control switch on the eye finding and tracking unit 14, thereby causing the infrared light source 16 to be activated. Alternately, the infrared light source 16 could be activated automatically by the unit 14, for example, when the subject's eyes cannot be found otherwise. Of course, if an infrared light source 16 is employed, the imaging apparatus 10 would be of the type capable of sensing infrared light.

The above-described system also includes an impaired operator detection unit 18 connected to an output of the eye finding and tracking unit 14, and an impaired operator warning unit 20 connected to an output of the detection unit 18. The impaired operator detection unit 18 processes the output of the of the eye finding and tracking unit 14, which, as will be discussed in detail later, includes an indication that an actual eye location has been identified and provides correlation data associated with that location for each successive image frame produced by the imaging apparatus 10. This output is processed by the impaired operator detection unit 18 in such a way that eyeblink characteristics are identified and compared to characteristics associated with an alert operator. This comparison data is provided to the impaired operator warning unit 20 which makes a determination whether the comparison data indicates the operator being monitored is impaired in some way, e.g. drowsy, intoxicated, or the like. The impaired operator detection unit 18 and impaired operator warning unit 20 can employ a digital computer to accomplish their respective processing tasks, or alternately, the processing could be performed by logic circuitry specifically designed for these tasks. If a computer is employed, it can be the same one potentially used in connection with the eye finding and tracking unit 14.

It is noted that the detection of an impaired operator may also involve processing inputs from at least one other device, specifically a corroborating operator alertness indicator unit 24, which provides additional "non-eyeblink determined" indications of the operators alertness level. For example, a device which provides an indication of a vehicle or machine operator's alertness level based on an analysis of the operators control actions could be employed in the appropriate circumstances.

The warning unit 20 also controls a warning device 22 used to warn the operator, or some other cognizant authority, of the operator's impaired condition. If the warning device 22 is used to warn the operator of his or her impairedness, it could be an alarm of any type which will rouse the operator, and can be directed at any one or more of the operator's senses. For example, an audible alarm might be sounded alone or in conjunction with flashing lights. Other examples of alarm mechanisms that might be used include those producing a vibration or shock to the operator. Even smells might be employed. It is known certain scents induce alertness. The warning device 22 could also be of a type that alerts someone other than the operator of the operator's impaired condition. For example, the supervisor in an air traffic control center might be warned of a controller's inability to perform adequately due to an impaired condition. If such a remote alarm is employed it can be of any type which attracts the attention of the person monitoring the operator's alertness, e.g. an audible alarm, flashing lights, and the like.

Figure 2:
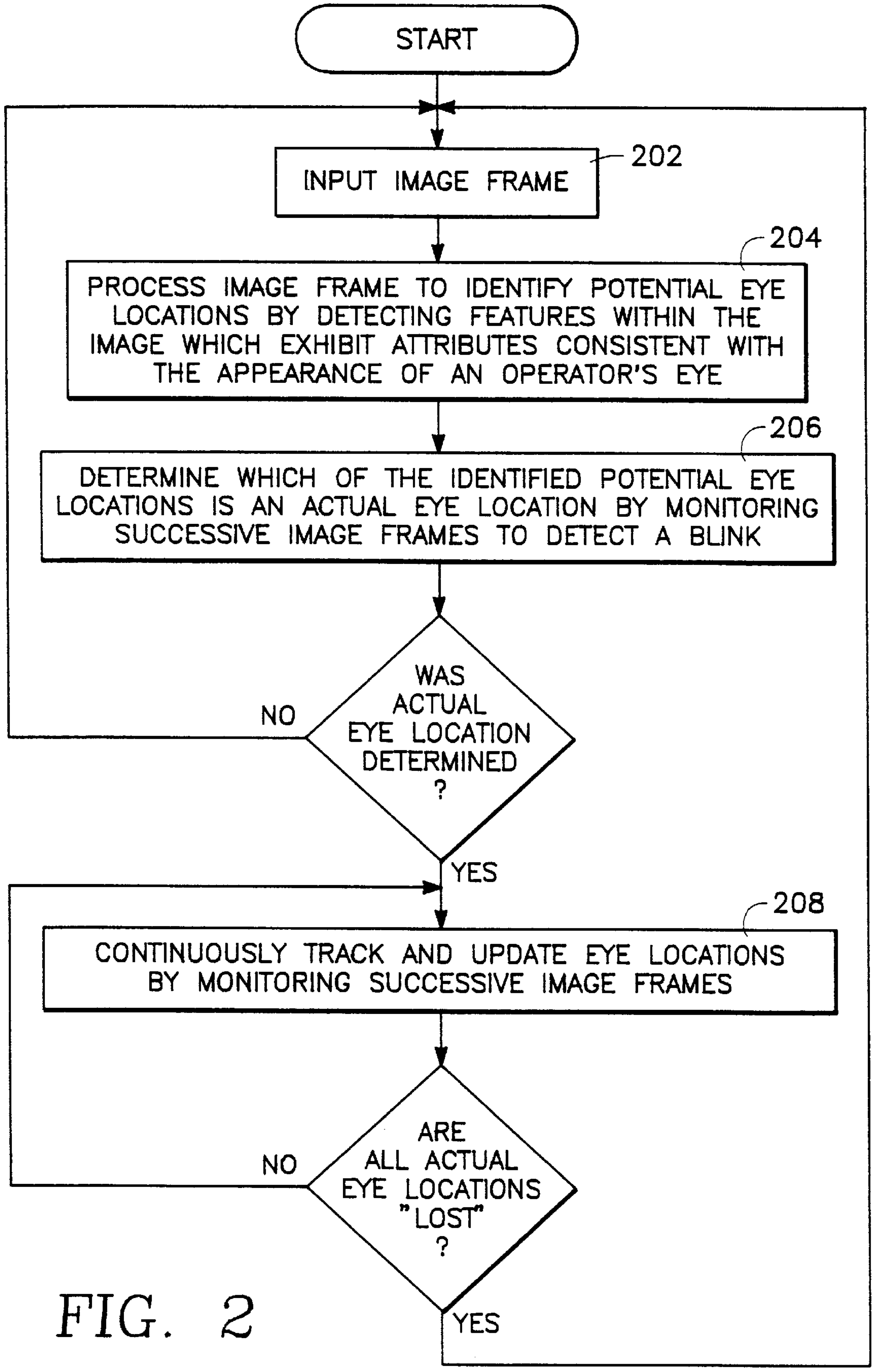
FIG. 2 is a preferred overall flow diagram of the process used in the eye finding and tracking unit of FIG. 1.

FIG. 2 is an overall flow diagram of the preferred process used to find and track the location of a subject's eyes. At step 202, a first image frame of the subject's face is inputted from the imaging apparatus to the eye finding and tracking unit. At step 204, the inputted image frame is processed to identify potential eye locations. This is preferably accomplished, as will be explained in detail later, by identifying features within the image frame which exhibit attributes consistent with those associated with the appearance of a subject's eye. This process is implemented in a recursive manner for efficiency. However, in the context of the present invention non-recursive, conventional processing techniques could be employed to determine eye locations, as long as the process results in an identification of potential eye locations within a digitized video image frame. Next, in step 206, a determination is made as to which of the potential eye locations is an actual eye of the subject. This is generally accomplished by monitoring successive image frames to detect a blink. If a blink is detected at a potential eye location, it is deemed an actual eye location. This monitoring and blink detection process will also be described in detail later. At step 208, the now determined actual eye locations are continuously tracked and updated using successive image frames. In addition, if the location of the actual eye locations are not found or are lost, the process is reinitialized by returning to step 202 and repeating the eye finding procedure.

Figure 3:
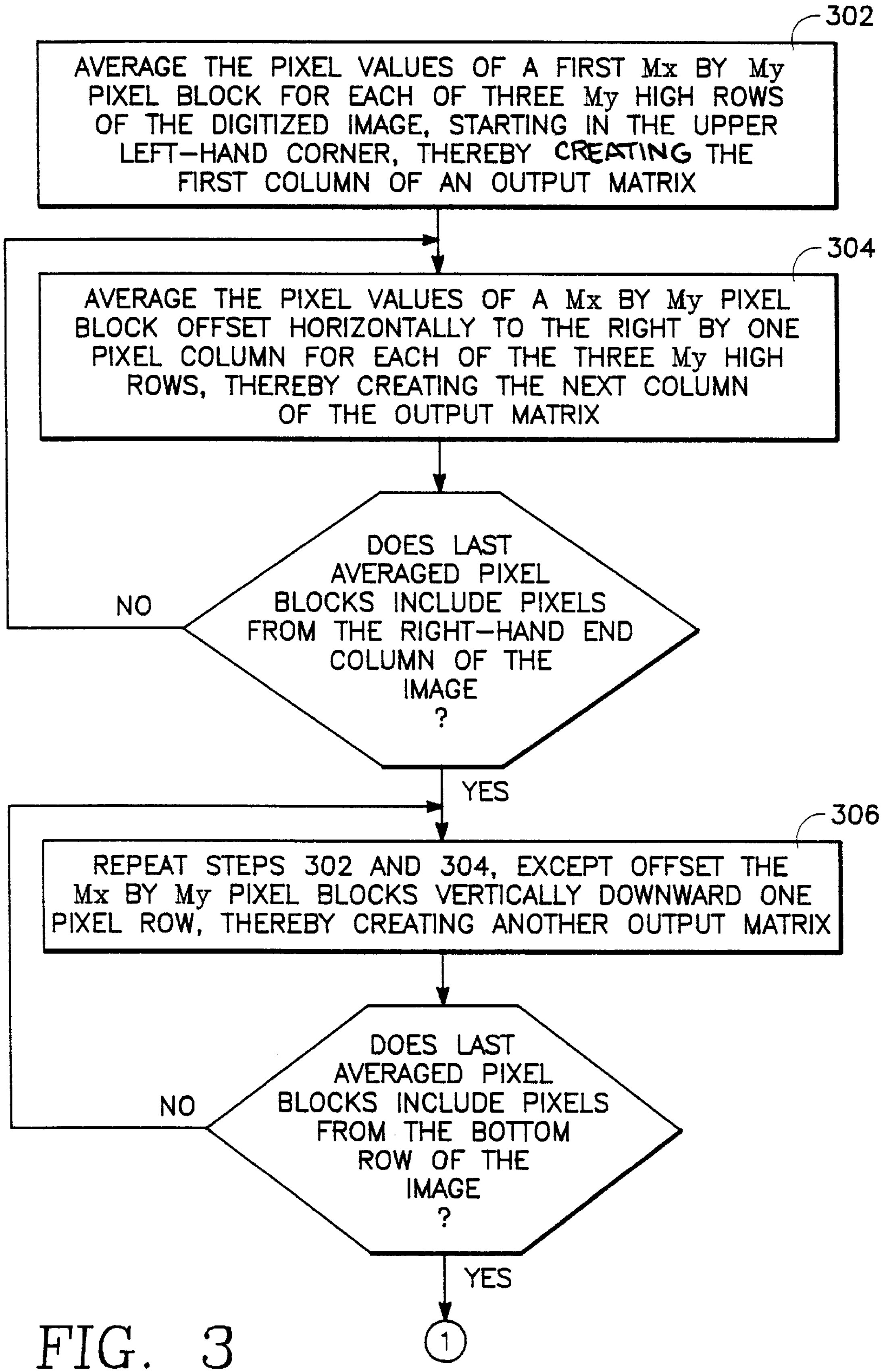
FIG. 3 is a flow diagram of a process for identifying potential eye locations (and optionally actual eye locations) within an image frame produced by the imaging apparatus of FIG. 1.
Figure 4:
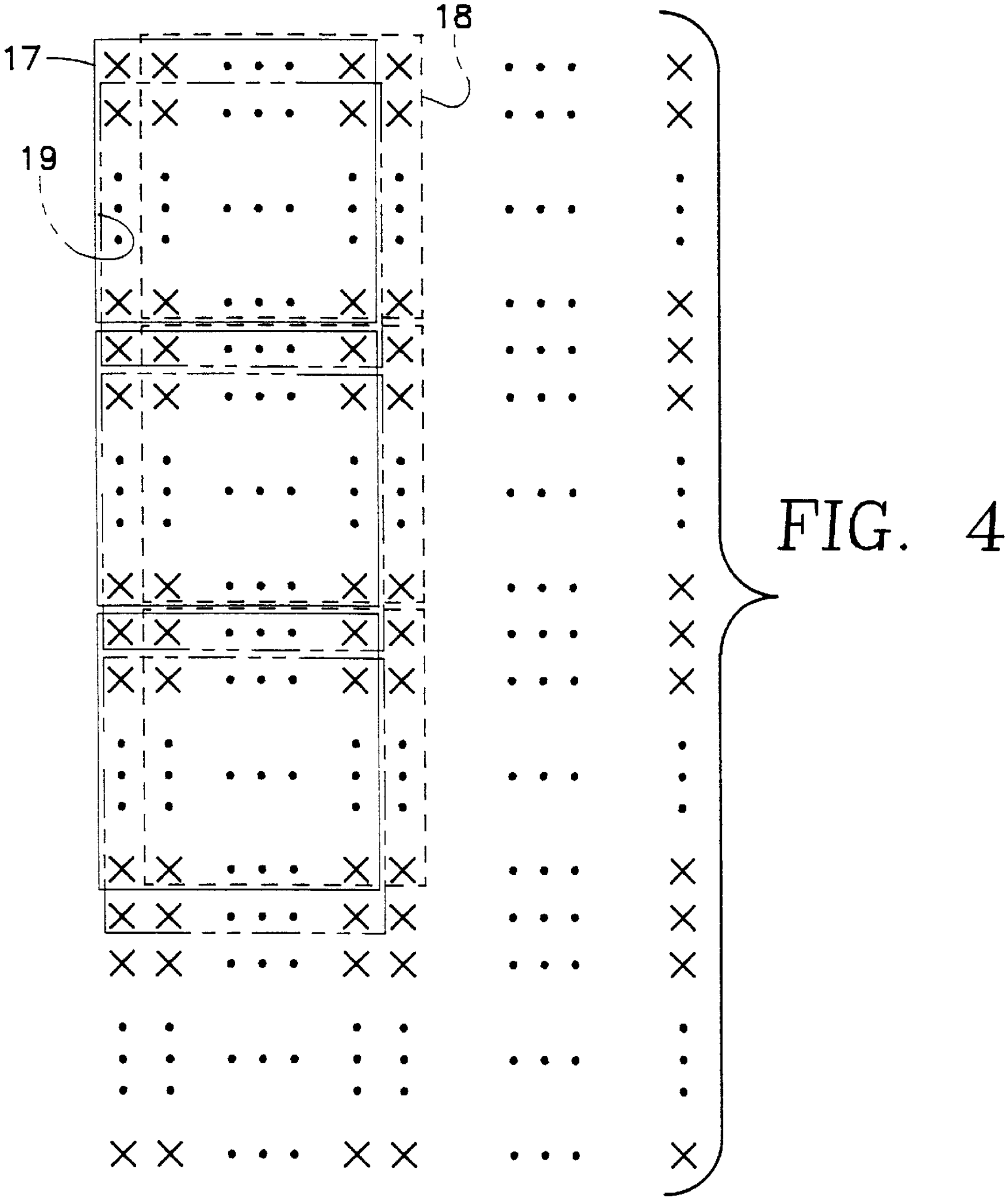
FIG. 4 is an idealized diagram of the pixels in an image frame including various exemplary pixel block designations applicable to the process of FIG. 3.

FIG. 3 is a flow diagram of the preferred process used to identify potential eye locations in the initial image frame, as disclosed in the aforementioned co-pending application. The first step 302 of the preferred process involves averaging the digitized image values which are representative of the pixel intensities of a first $M_x$ by $M_y$ block of pixels for each of three $M_y$ high rows of the digitized image, starting in the upper left-hand corner of the image frame, as depicted by the solid line boxes 17 in FIG. 4. The three averages obtained in step 302 are used to form the first column of an output matrix. The $M_x$ variable represents a number of pixels in the horizontal direction of the image frame, and the $M_y$ variable represents a number of pixels in the vertical direction of the image frame. These variables are chosen so that the resulting $M_x$ by $M_y$ pixel block has a size which just encompasses the minimum expected size of the iris and pupil portions of a subject's eye. In this way, the pixel block would contain an image of the pupil and at least a part of the iris of any subject's eye.

Once the first column of the output matrix has been created by averaging the first three $M_x$ by $M_y$ pixel blocks in the upper right-hand portion of the image frame, the next step 304 is to create the next column of the output matrix. This is accomplished by averaging the intensity representing values of a $M_x$ by $M_y$ pixel block which is offset horizontally to the right by one pixel column from the first pixel block for each of the three aforementioned $M_y$ high rows, as shown by the broken line boxes 18 in FIG. 4. This process is repeated, moving one pixel column to the right during each iteration, until the ends of the three $M_y$ high rows in the upper portion of the image frame are reached. The result is one completed output matrix. The next step 306 in the process is to repeat steps 302 and 304, except that the $M_x$ by $M_y$ pixel blocks being averaged are offset vertically downward from the previous pixel blocks by one pixel row, as depicted by the dashed and dotted line boxes 19 in FIG. 4. This produces a second complete output matrix. This process of offsetting the blocks vertically downward by one pixel row is then continued until the bottom of the image frame is reached, thereby forming a group of output matrices.

In step 308, each element of each output matrix in the group of generated output matrices is compared with a threshold range. Those matrix elements which exceed the lower limit of the threshold range and are less than the upper limit of this range, are flagged (step 310). The upper limit of the threshold range corresponds to a value which represents the maximum expected average intensity of a $M_x$ by $M_y$ pixel block containing an image of the iris and pupil of a subject's eye for the illumination conditions that are present at the time the image was captured. The maximum average intensity of block containing the image of the subject's pupil and at least a portion of the iris will be lower than the same size portion of most other areas of the subject's face because the pupil absorbs a substantial portion of the light impinging thereon. Thus, the upper threshold limit is a good way of eliminating portions of the image frame which cannot be the subject's eye. However, it must be noted that there are some things that could be in the image of the subject's face which do absorb more light than the pupil. For example, black hair can under some circumstances absorb more light. In addition, if the image is taken at night, the background surrounding the subject's face could be almost totally black. The lower threshold limit is employed to eliminate these portions of the image frame which cannot be the subject's eye. The lower limit corresponds to a value which represents the minimum expected average intensity of a $M_x$ by $M_y$ pixel block containing an image of the pupil and at least a portion of the subject's iris. Here again, this minimum is based on the illumination conditions that are present at the time the image is captured.

Next, in step 312, the average intensity value of each $M_x$ by $M_y$ pixel block which surrounds the $M_x$ by $M_y$ pixel block associated with each of the flagged output matrix elements is compared to an output matrix threshold value. In one embodiment of the present invention, this threshold value represents the lowest expected average intensity possible for the pixel block sized areas immediately adjacent the portion of an image frame containing the subject's pupil and iris.

Thus, if the average intensity of the surrounding pixel blocks exceeds the threshold value, then a reasonably high probability exists that the flagged block is associated with the location of the subject's eye. Thus, the pixel block associated with the flagged element is designated a potential eye location (step 314). However, if one or more of the average intensity values for the blocks surrounding the flagged block falls below the threshold, then the flagged block is eliminated as a potential eye location (step 316). This comparison concept is taken further in a preferred embodiment of the present invention where a separate threshold value is applied to each of the surrounding pixel block averages. This has particular utility because some of the areas immediately surrounding the iris and pupil exhibit unique average intensity values which can be used to increased the confidence that the flagged pixel block is good prospect for a potential eye location. For example, the areas immediately to the left and right of the iris and pupil include the white parts of the eye. Thus, these areas tend to exhibit a greater average intensity than most other areas of the face. Further, it has been found that the areas directly above and below the iris and pupil are often in shadow. Thus, the average intensity of these areas is expected to be less than many other areas of the face, although greater than the average intensity of the portion of the image containing the iris and pupil. Given the aforementioned unique average intensity profile of the areas surrounding the iris and pupil, it is possible to chose threshold values to reflect these traits. For example, the threshold value applied to the average intensity value of the pixel blocks directly to the left and right of the flagged block would be just below the minimum expected average intensity for these relatively light areas of the face, and the threshold value applied to the average intensity values associated with the pixel block directly above and below the flagged block would be just above the maximum expected average intensity for these relative dark regions of the face. Similarly, the pixel blocks diagonal to the flagged block would be assigned threshold values which are just below the minimum expected average intensity for the block whenever the average intensity for the block is generally lighter than the rest of the face, and just above the maximum expected average intensity for a particular block if the average intensity of the block is generally darker than the rest of the face. If the average intensity of the "lighter" blocks exceeds the respectively assigned threshold value, or the "darker" blocks are less than the respectively assigned threshold value, then the flagged pixel block is deemed a potential eye location. If any of the surrounding pixel blocks do not meet this thresholding criteria, then the flagged pixel block is eliminated as a potential eye location.

Of course, because the output matrices were generated using the previously-described "one pixel column and one pixel row offset" approach, some of the matrices will contain rows having identical elements as others because they characterize the same pixels of the image frame. This does not present a problem in identifying the pixel block locations associated with potential eye locations as the elements flagged by the above-described thresholding process in multiple matrices which correspond to the same pixels of the image frame will be identified as a single location. If fact, this multiplicity serves to add redundancy to the identification process. However, it is preferred that the pixel block associated with a flagged matrix element correspond to the portion of the image centered on the subject's pupil. The aforementioned "offset" approach will result in some of the matrices containing elements which represent pixel blocks that are one pixel column or one pixel row removed from the block containing the centered pupil. Thus, the average intensity value of these blocks can be quite close, or even identical, to that of the block representing the centered pupil. Thus, the matrix elements representing these blocks may also be identified as potential eye locations via the above-described thresholding process. To compensate, the next step 318 in the process of identifying potential eye locations is to examine flagged matrix elements associated with the previously-designated potential eye locations which correspond to blocks having pixels in common with pixel blocks associated with other flagged elements. Only the matrix element representing the block having the minimum average intensity among the examined group of elements, or which is centered within the group, remain flagged. The others are de-selected and no longer considered potential eye locations (step 320).

Actual eye locations are identified from the potential eye locations by observing subsequent image frames in order to detect a blink, i.e. a good indication a potential eye location is an actual eye location. A preliminary determination in this blink detecting process (and as will be seen the eye tracking process) is to identify the image pixel in the original image frame which constitutes the center of the pupil of each identified potential eye location. As the pixel block associated with the identified potential eye location should be centered on the pupil, finding the center of the pupil can be approximated by simply selecting the pixel representing the center of the pixel block. Alternately, a more intensive process can be employed to ensure a the accuracy of the identified pupil center location. This is accomplished by first, comparing each of the pixels in an identified block to a threshold value, and flagging those pixels which fall below this threshold value. The purpose of applying the threshold value is to identify those pixel of the image which correspond to the pupil of the eye. As the pixels associated with the pupil image will have a lower intensity than the surrounding iris, the threshold value is chosen to approximate the highest intensity expected from the pupil image for the illumination conditions present at the time the image was captured. This ensures that only the darker pupil pixels are selected and not the pixels imaging the relatively lighter surrounding iris structures. Once the pixels associated with the pupil are flagged, the next step is to determine the geographic center of the selected pixels. This geographic center will be the pixel of the image which represents the center of the pupil, as the pupil is circular in shape. The geographic center of the selected pixels can be accomplished in a variety of ways. For example, the pixel block associated with the potential eye location can be scanned horizontally, column by column, until one of the selected pixels is detected within a column. This column location is noted and the horizontal scan is continued until a column containing no selected pixels is found. This second column location is also noted. A similar scanning process is then conducted vertically, so as to identify the first row in the block containing a selected pixel and the next subsequent row containing no selected pixels. The center of the pupil is chosen as the pixel having a column location in-between the noted columns and a row location in-between the noted rows. Any noise in the image or spots in the iris, which are dark enough to be selected in the aforementioned thresholding step, can skew the results of the just-described process. However, this possibility can be eliminated in a number of way, for example by requiring there be a prescribed number of pixel columns or rows following the first detection before that column or row is noted as the outside edge of the pupil.

A blink at a potential eye location represents itself as a brief period where the eyelid is closed, e.g. about 2–3 image frames in length based on an imaging system producing about 30 frames per second. This would appear as a "disappearance" of a potential eye at an identified location for a few successive frames, followed by its "reappearance" in the next frame. The eye "disappears" from an image frame during the blink because the eyelid which covers the iris and pupil will exhibit a much greater average pixel intensity. Thus, the closed eye will not be detected by the previously-described thresholding process. Further, it is noted that when the eye opens again after the completion of the blink, it will be in approximately the same location as identified prior to the blink if a reasonable frame speed is employed by the imaging system. For example, a 30 frames per second rate is adequate to ensure the eye has not moved significantly in the 2–3 frames it takes to blink. Any slight movement of the eye is detected and compensated for by a correlation procedure to be described shortly.

Figure 6:
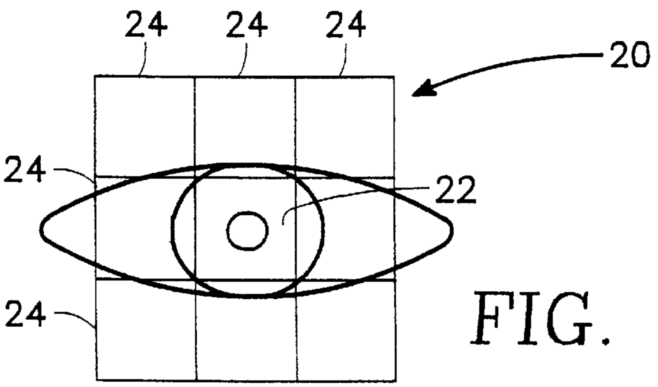
FIG. 6 is a diagram showing a cut-out block of an image frame applicable to the process of FIG. 5.
Figure 5:
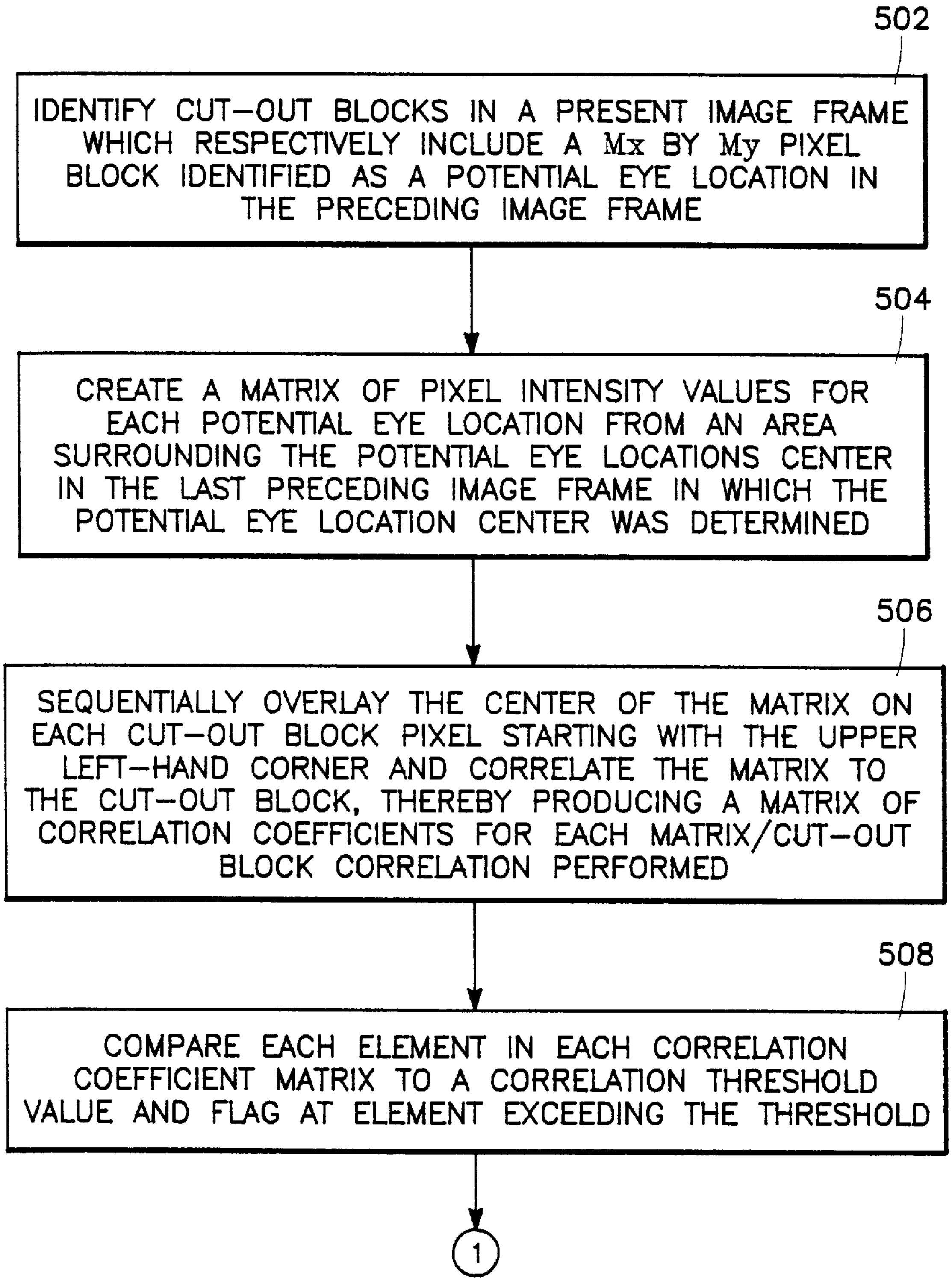
FIG. 5 is a flow diagram of a process for tracking eye locations in successive image frames produced by the imaging apparatus of FIG. 1, as well as a process of detecting a blink at a potential eye location to identify it as an actual eye location.
Figure 6:
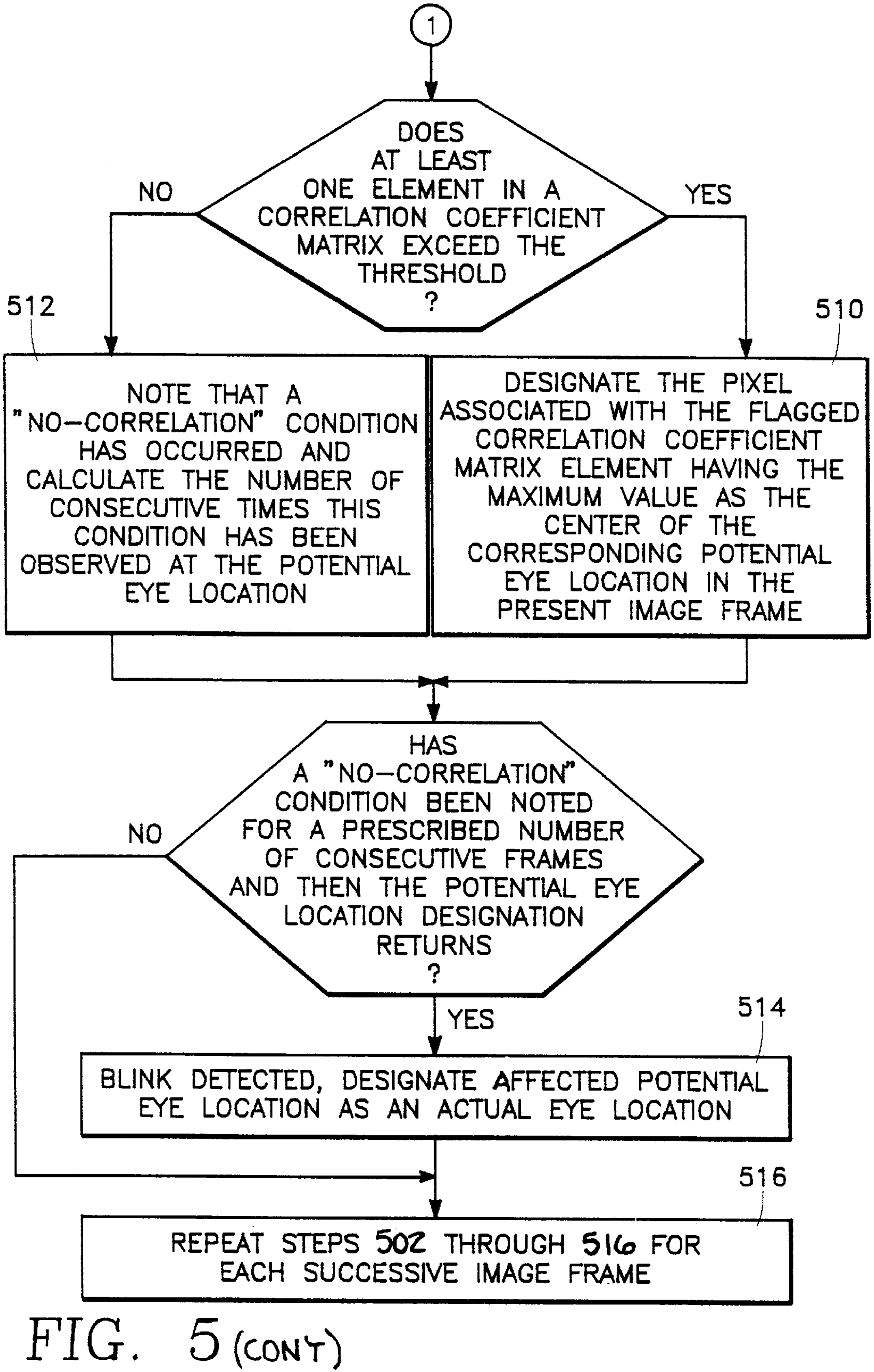

The subsequent image frames could be processed as described above to re-identify potential eye locations which would then be correlated to the locations identified in previous frames in order to track the potential eyes in anticipation of detecting a blink. However, processing the entire image in subsequent frames requires considerable processing power and may not provide as accurate location data. FIG. 5 is a flow diagram of the preferred eye location tracking and blink detection process used to identify and track actual eye locations among the potential eye locations identified previously (i.e. steps 302 through 320 of FIG. 3). However, as will be discussed later, this process also provides correlation data which will be employed to detect an impaired operator. This preferred process uses cut-out blocks in the subsequent frames which are correlated to the potential eye locations in the previous frame to determine a new eye location. Processing just the cutout blocks rather than the entire image saves considerable processing resources. The first step 502 in the process involves identifying the aforementioned cut-out blocks within the second image frame produced by the imaging system. This is preferably accomplished by identifying cut-out pixel blocks 20 in the second frame, each of which includes the pixel block 22 corresponding to the location of the block identified as a potential eye location in the previous image frame, and all adjacent $M_x$ by $M_y$ pixel blocks 24, as shown in FIG. 6. Next, in step 504, a matrix is created from the first image for each potential eye location. This matrix includes all the represented pixel intensities in an area surrounding the determined center of a potential eye location. Preferably, this area is bigger than the cut-out block employed in the second image. For example, an area having a size of 100 by 50 pixels could be employed. The center element of each matrix (which corresponds to the determined center of the pupil of the potential eye) is then "overlaid" in step 506 on each pixel in the associated cut-out block in the second image frame, starting with the pixel in the upper left-hand corner. A correlation procedure is then performed between each matrix and the overlaid pixels of its associated cutout block. This correlation is accomplished using any appropriate conventional matrix correlation process. As these correlation processes are known in the art, no further detail will be provided herein. The result of the correlation is a correlation coefficient representing the degree to which the pixel matrix from the first image frame corresponded to the overlaid position in the associated cutout block. This process is repeated for all the pixel locations in each cut-out block to produce a correlation coefficient matrix for each potential eye location. In step 508, a threshold value is compared to each element in the correlation coefficient matrices, and those which exceed the threshold are flagged. The flagged element in each of these correlation coefficient matrices which is larger than the rest of the elements corresponds to the pixel location in the second image which most closely matches the intensity profile of the associated potential eye location identified in the first image, and represents the center of the updated potential eye location in the second image frame. If such a maximum value is found, the corresponding pixel location in the second image is designated as the new center of the potential eye location (step 510). The threshold value was applied to ensure the pixel intensity values in the second frame were at least "in line" with those in the corresponding potential eye locations in the first image. Thus, the threshold is chosen so as to ensure a relatively high degree of correlation is observed. For example, a threshold value of at least 0.5 could be employed.

If none of the correlation coefficients exceeded the correlation threshold in a given iteration of the tracking procedure, then this is an indication the eye has been "lost", or perhaps a blink is occurring. This "no-correlation" condition is noted. Subsequent frames are then monitored and the number of consecutive times the "no-correlation" condition occurs is calculated in step 512. Whenever, a no-correlation condition exists from a period of 2–3 frames, and then the potential eye is detected once again, this is indicative of a blink. If a blink is so detected, the status of the potential eye location is upgraded to a high confidence actual eye location (step 514). This is possible because an eye will always exhibit this blink response, and so the location can be deemed that of an actual eye with a high degree of confidence. The eye tracking and blink detection process (of FIG. 5) is repeated for each successive frame generated by the imaging apparatus with the addition that actual eye locations are tracked as well as the remaining potential eye locations (step 516). This allows the position of the actual and potential eye locations to be continuously updated. It is noted that the pixel matrix from the immediately preceding frame is used for the aforementioned correlation procedure whenever possible. However, where a no-correlation condition exists in any iteration of the tracking process, the present image is correlated using the pixel matrix from the last image frame where the affected eye location was updated.

Figure 7:
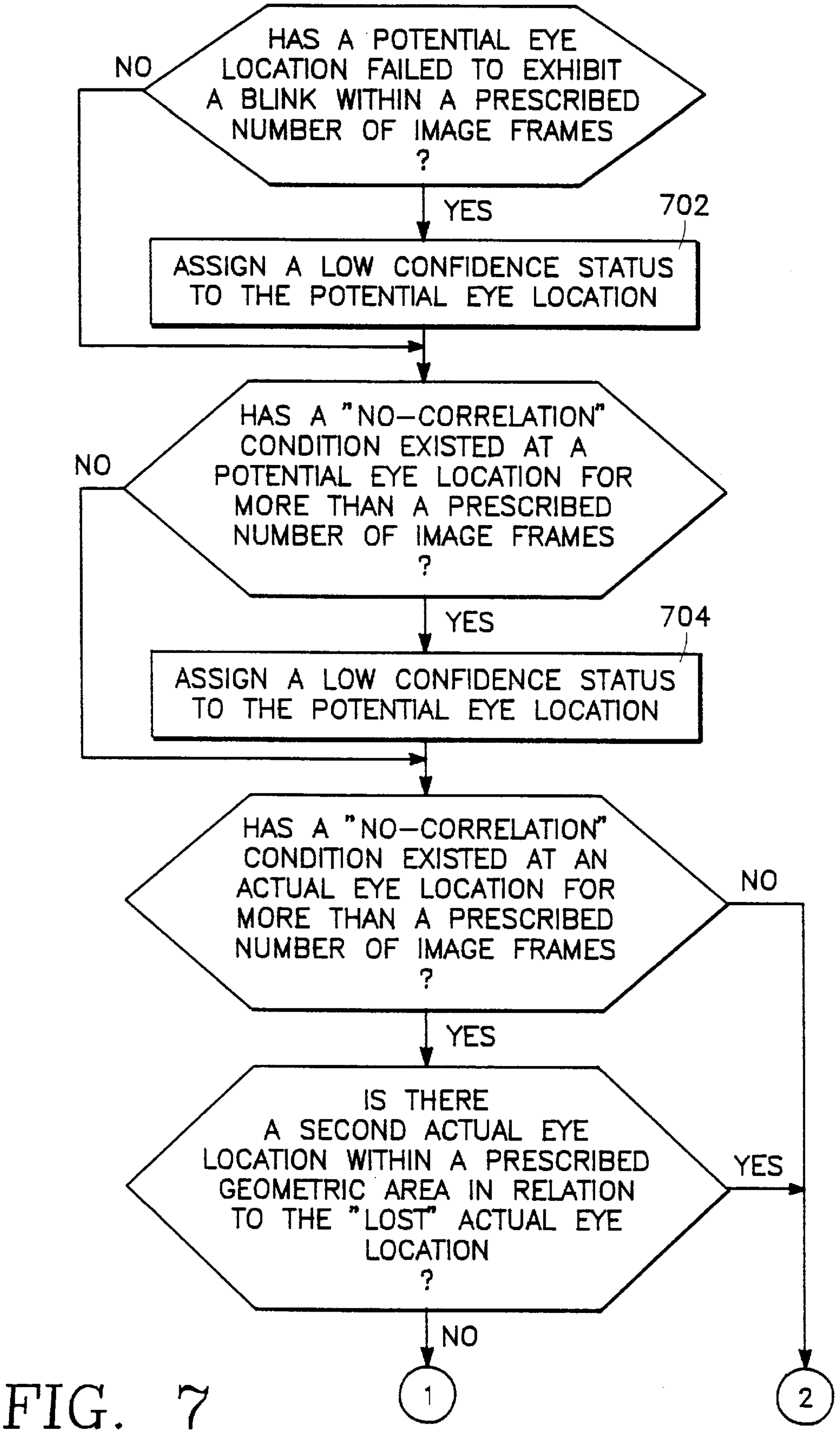
FIG. 7 is a flow diagram of a process for monitoring potential and actual eye locations and to reinitialize the eye finding and tracking system if all monitored eye locations are deemed low confidence locations.

Referring now to FIG. 7, if a potential eye location does not exhibit a blink response within 150 image frames, it is still tracked but assigned a low confidence status (i.e. a low probability it is an actual eye location) at step 702. Similarly, if a potential eye location becomes "lost" in that there is a no-correlation condition for more than 150 frames, this location is assigned a low confidence status (step 704). Further, if a blink has been detected at a potential eye location and its status upgraded to an actual eye location, but then this location is "lost", its status will depend on a secondary factor. This secondary factor is the presence of a second actual eye location having a geometric relationship to the first, as was described previously. If such a second eye location exists, the high confidence status of the "lost" actual eye does not change. If, however, there is no second eye location, then the "lost" actual eye is downgraded to a low confidence potential eye location (step 706). The determination of high and low confidence is important because, the tracking process continues for all potential or actual eye locations only for as long as there is at least one remaining high confidence actual eye location or an un-designated potential eye location (i.e. a potential eye location which has not been assigned a low confidence status) being monitored (step 708). However, if only low confidence locations exist, the system is re-initialized and the entire eye finding and tracking process starts over (step 710).

Figure 8A:
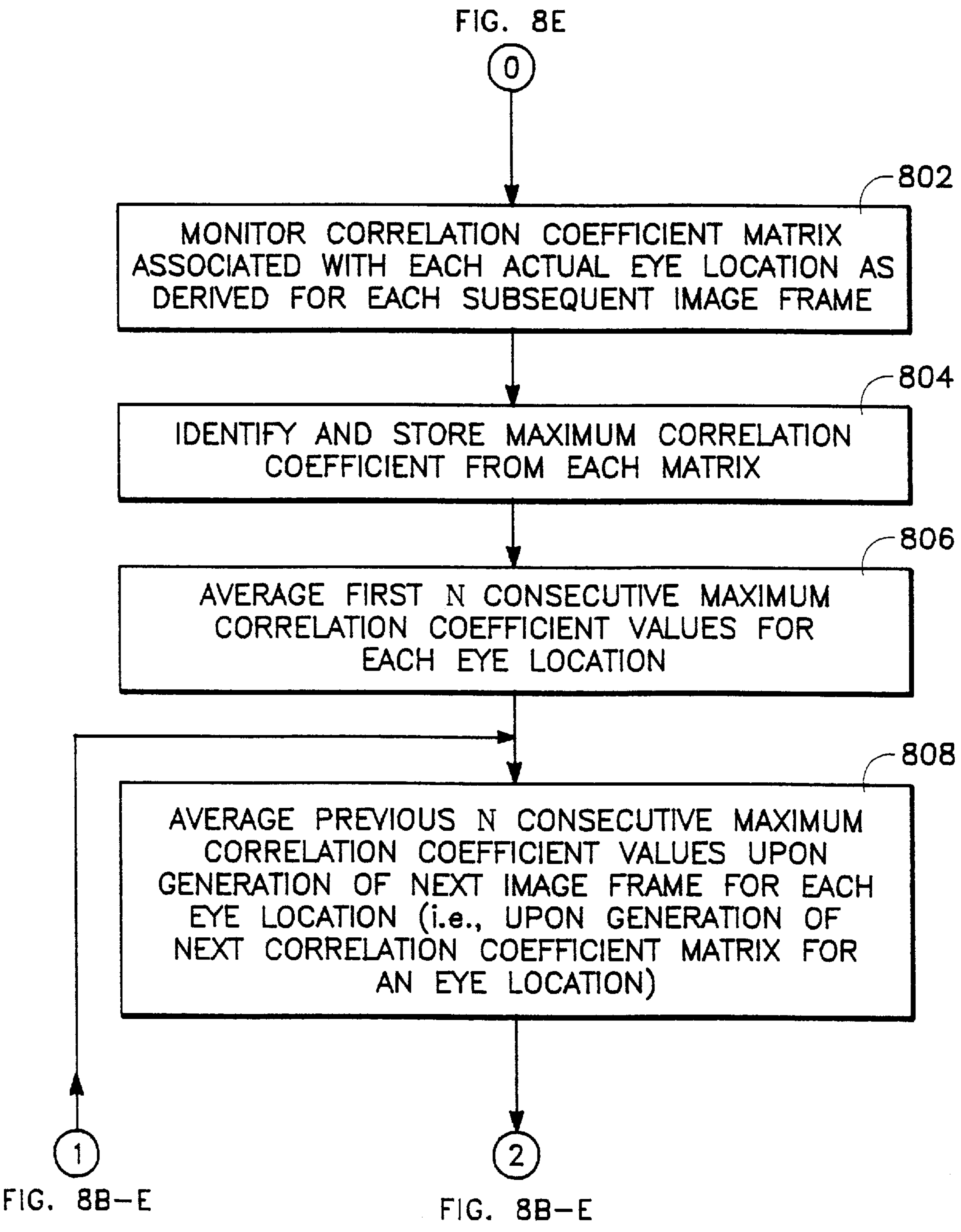
FIGS. 8A–E are flow diagrams of the preferred processes used in the impaired operator detection unit of FIG. 1.

Once at least one actual eye location has been identified, the impaired operator detection process, depicted in FIGS. 8A–E, can begin. As shown in FIG. 8A, the first step 802 in the process is to begin monitoring the correlation coefficient matrix associated with an identified actual eye location as derived for each subsequent image frame produced by the imaging apparatus. It will be remembered that the center element of each pixel matrix corresponding to a potential or actual eye location in a previous image frame was "overlaid" (step 506 of FIG. 5) onto each pixel in the associated cut-out block in a current image frame, starting with the pixel in the upper left-hand corner. A correlation procedure was performed between the matrix and the overlaid pixels of its associated cutout block. The result of the correlation was a correlation coefficient representing the degree to which the pixel matrix from the first image frame corresponded to the overlaid position in the associated cutout block. The correlation process was then repeated for all the pixel locations in each cut-out block to produce a correlation coefficient matrix for each potential or actual eye location. This is the correlation coefficient matrix, as associated with an identified actual eye location, that is employed in step 802. In the next step 804, the correlation coefficient having the maximum value within a correlation coefficient matrix is identified and stored. The maximum correlation coefficient matrix values from each image frame are then put through a recursive analysis. Essentially, when the first N consecutive maximum correlation coefficient values for each identified actual eye location have been stored, these values are averaged (step 806). N is chosen so as to at least correspond to the number of image frames it would take to image the longest expected duration of a blink. For example, in a tested embodiment of the present invention, N was chosen as seven frames which corresponded to 0.25 seconds based on an imaging frame rate of about 30 frames per second. This averaging process is then repeated for each identified actual eye location upon the production of each subsequent image frame (and so each new correlation coefficient matrix), except that the immediately preceding N maximum correlation coefficient values are employed rather than the first N values (step 808). Thus, an updated average is provided every frame. The above-described process is performed simultaneously for each identified actual eye location, so that both eyes can be analyzed independently.

Figure 9A:
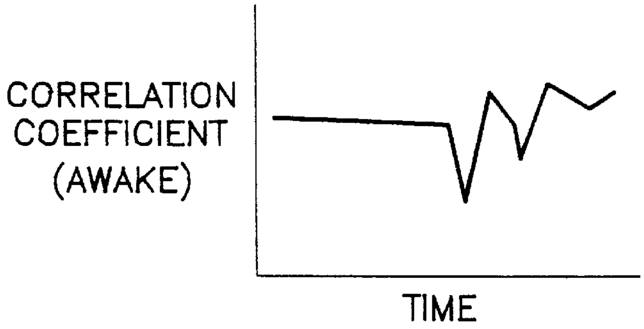
FIGS. 9A–B are graphs representing the average correlation coefficients determined via the process of FIG. 8A over time for the right eye of an alert operator (FIG. 9A) and the same operator when drowsy (FIG. 9B).
Figure 9B:
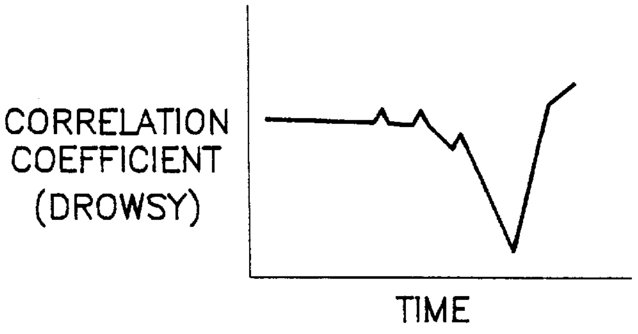
Figure 8B:
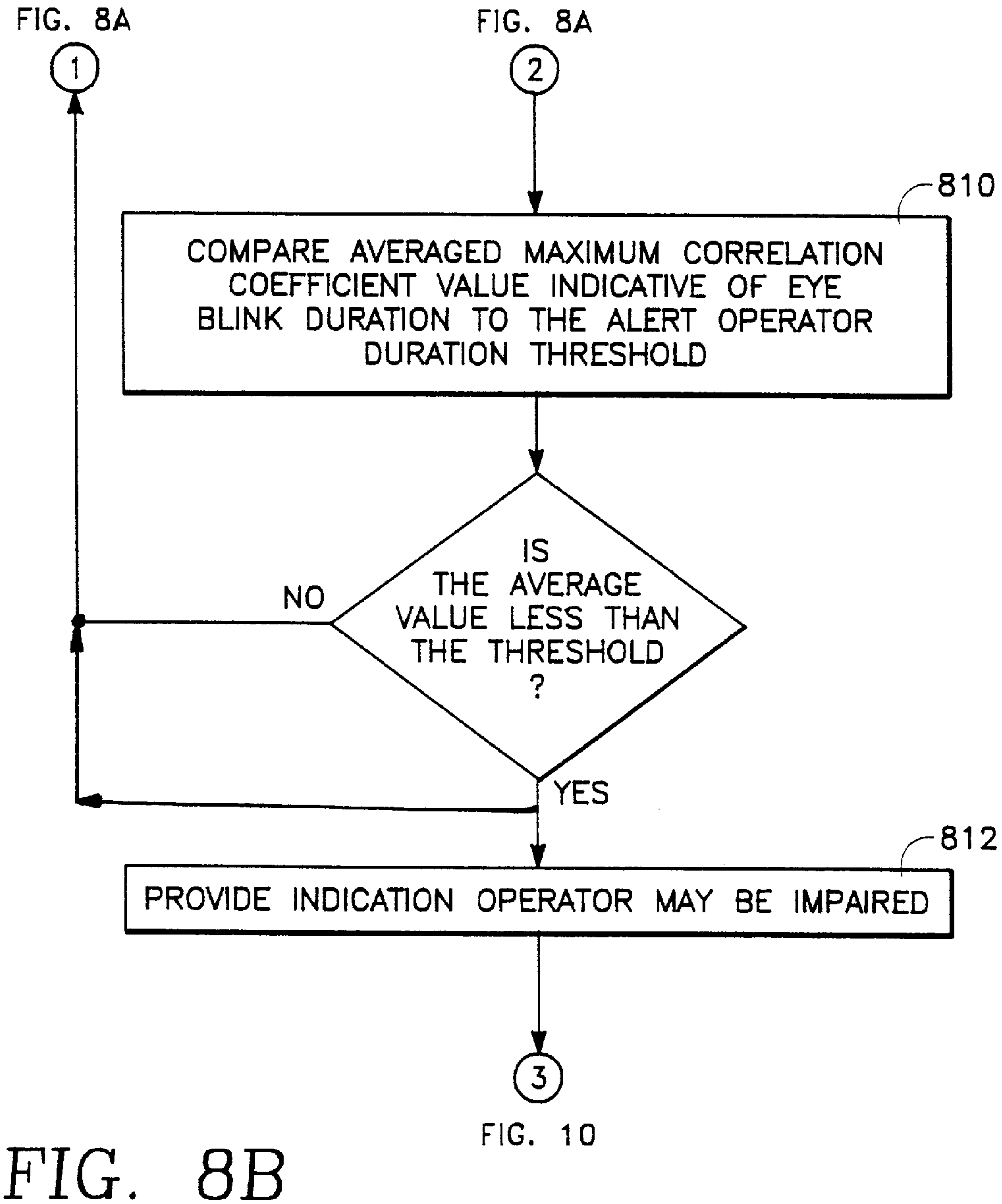

FIGS. 9A–B graph the maximum correlation coefficients identified and stored over a period of time for the right eye of an alert operator and a drowsy operator, respectively, as derived from a tested embodiment of the present invention. The dip in both graphs toward the right-hand side represent blinks. It is evident from these graphs that the average correlation coefficient value associated with an alert operator's blink will be significantly higher than that of a drowsy operator's blink. It is believed that a similar divergence will exist with other "non-alert" states such as when an operator is intoxicated. Further, it is noted that the average correlation coefficient value over N frames which cover a complete blink of an operator, alert or impaired, will be lower than any other N frame average. Therefore, as depicted in FIG. 8B, one way of detecting an impaired operator would be to compare the average maximum correlation coefficient value (as derived in step 806) to a threshold representing the average maximum correlation coefficient value which would be obtained for N image frames covering an alert operator's blink (step 810). If the derived average was less than the alert operator threshold, then this would be an indication that the operator may be impaired in some way, and in step 812 an indication of such is provided to the impaired operator warning unit (of FIG. 1). Further, the threshold can be made applicable to any operator by choosing it to correspond to the minimum expected average for any alert operator. It is believed the minimum average associated with an alert operator will still be significantly higher than even a maximum average associated with an impaired operator. The average maximum correlation coefficient value associated with N frames encompassing an entire blink is related to the duration of the blink. Namely, the longer the duration of the blink, the lower the average. This is consistent with the phenomenon that an impaired operator's blink is slower than that of an alert operator. This eyeblink duration determination and comparison process is repeated for each image frame produced subsequent to the initial duration determination.

Figure 8C:
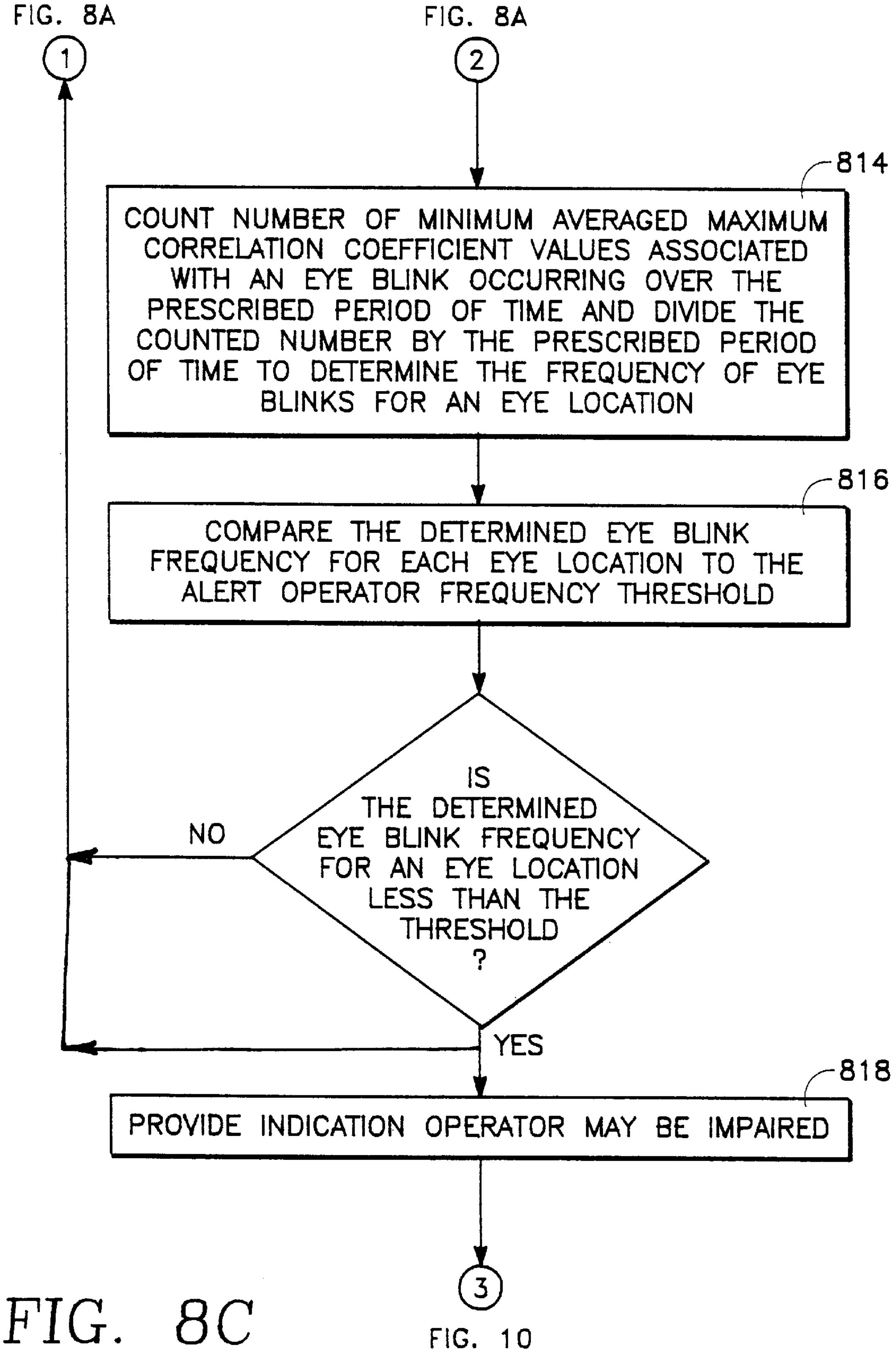

Another blink characteristic which tends to distinguish an alert operator from an impaired operator is the frequency of blinks. Typically, an impaired individual will blink less often than an alert individual. The frequency of an operator's blinks can be imputed from the change in derived average maximum correlation coefficient values over time. Referring to FIG. 8C, this is accomplished by counting the number of minimum average values associated with a blink for each identified actual eye location that occurs over a prescribed period of time, and dividing this number by that period to determine the frequency of blinks (step 814). The occurrence of a minimum average can be determined by identifying an average value having averages associated with the previous and subsequent few frames which are greater, and which is below an expected blink average. The expected blink average is an average corresponding to the maximum that would still be consistent with a blink of an alert operator. Requiring the identified minimum average to exceed this expected average ensures the minimum average is associated with a blink and not just slight movement of the eyelid between blinks. The prescribed period of time is chosen so as to average out any variations in the time between blinks. For example, counting the number of minimums that occur over 60 seconds would provide a satisfactory result. Once the frequency of blinks has been established it is compared to a threshold value representing the minimum blink frequency expected from an alert operator (step 816). If the derived frequency is less than the blink frequency threshold, then this would be an indication that the operator was impaired, and in step 818, an indication of such is provided to the impaired operator warning unit. This frequency determination and comparison process would be continually repeated for each image frame produced subsequent to the initial frequency determination, except that only those average coefficient values derived over a preceding period of time equivalent to the prescribed period would be analyzed.

Figure 8D:
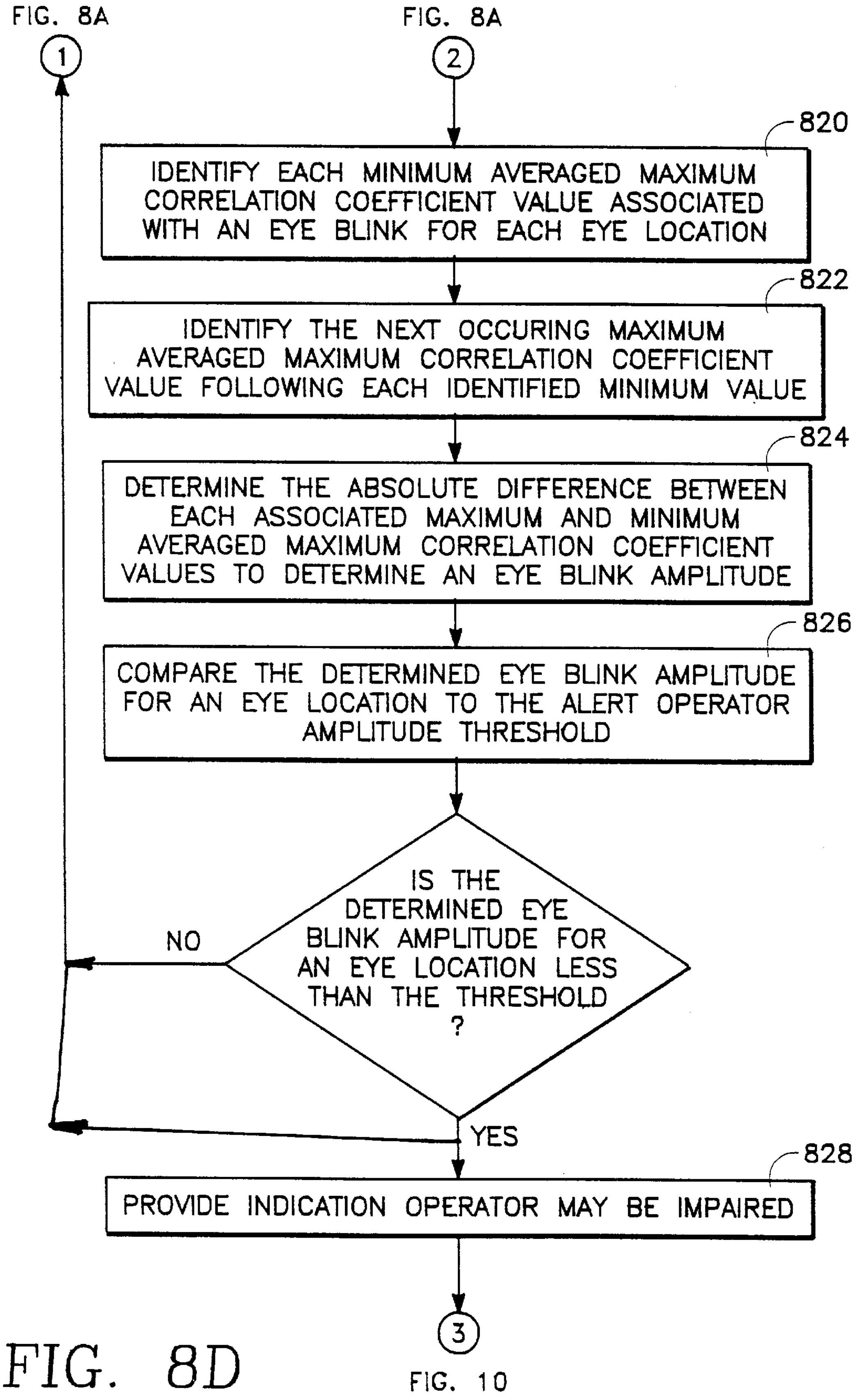

Yet another blink characteristic that could be utilized to distinguish an alert operator from an impaired operator is the completeness of an operator's blinks. It has been found that an impaired individual's blink will not be as complete as that of an alert individual. In other words, an impaired operator's eye will not completely close. It is believed this incomplete closure will result in the previously-described minimum average values being greater for an impaired individual than an alert one. The completeness of an operator's blink can be imputed from the difference between the minimum average value and the maximum average value associated with a blink. Thus, a minimum average value is identified as before (step 820) for each identified actual eye location, as shown in FIG. 8D. Then, in step 822, the next occurring maximum average value is ascertained. This is accomplished by identifying the next average value which has a few lesser values both preceding it and following it. The absolute difference between the minimum and maximum values is determined in step 824. This absolute difference is a measure of the completeness of the blink and can be referred to as the amplitude of the blink. Once the amplitude of a blink has been established for an identified actual eye location, it is compared to a threshold value representing the minimum blink amplitude expected from an alert operator (step 826). If the derived amplitude is less than the blink amplitude threshold, then this would also be an indication that the operator is impaired, and in step 828, an indication of such is provided to the impaired operator warning unit. Here too, the blink amplitude determination and comparison process is repeated for each image frame produced subsequent to the initial frequency determination so that each subsequent blink is analyzed.

Figure 8E:
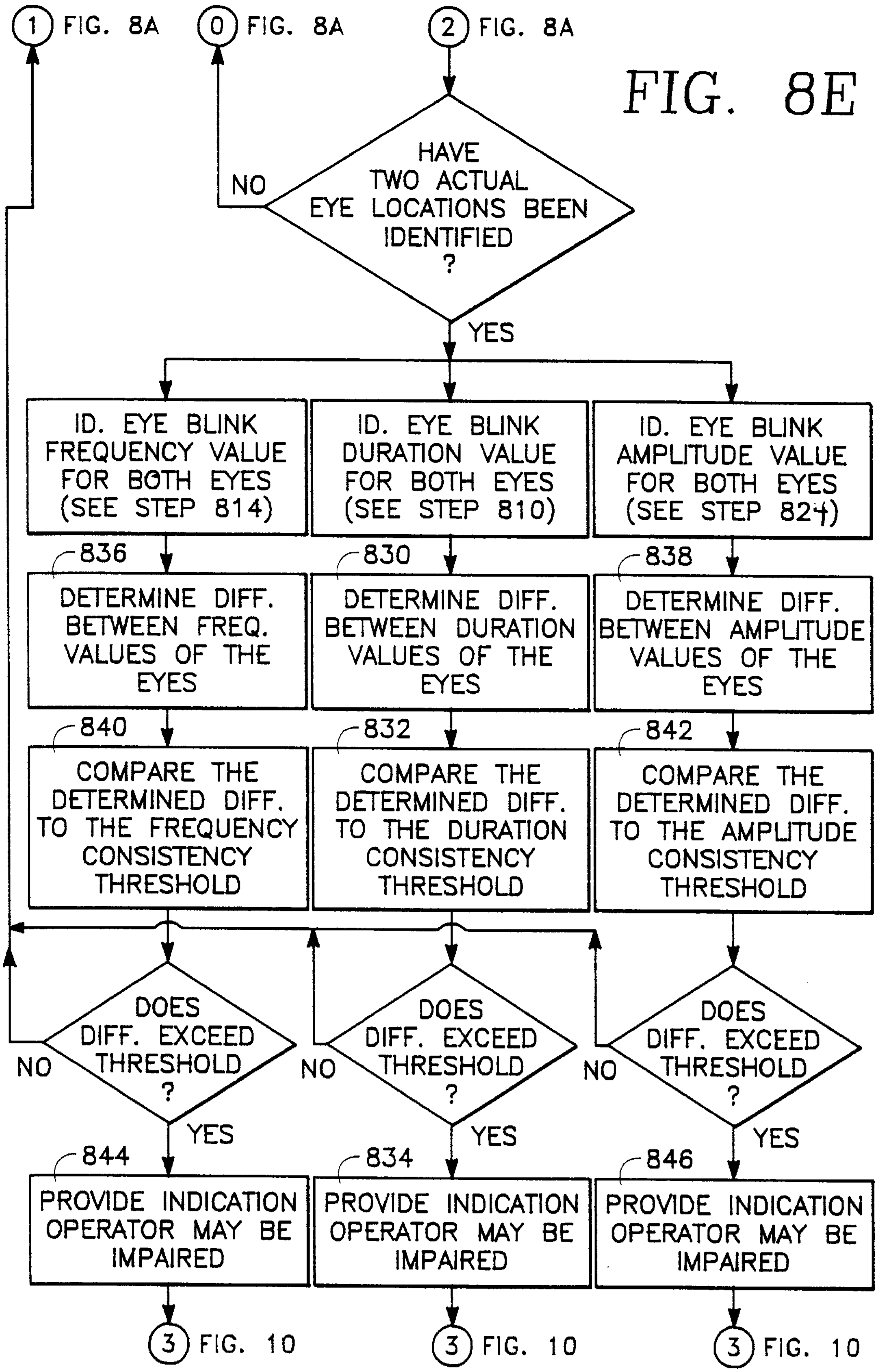

Still another blink characteristic that could be utilized to distinguish an alert operator from an impaired operator is the consistency of blink characteristics between the left and right eyes of an operator. It has been found that the duration, frequency and/or amplitude of an alert individual's contemporaneously occurring blinks will be be apparent consistent between eyes, whereas this consistency is less apparent in an impaired individual's blinks. When two actual eye locations have been identified and are being analyzed, the difference between like characteristics can be determined and compared to a consistency threshold. Preferably, this is done by determining the difference between a characteristic occurring in one eye and the next like characteristic occurring in the other eye. It does not matter which eye is chosen first. If two actual eye locations have not been identified, the consistency analysis is postponed until both locations are available for analysis. Referring to FIG. 8E, the aforementioned consistency analysis process preferably includes determining the difference between the average maximum correlation coefficient values (which are indicative of the duration of a blink) for the left and right eyes (step 830) and then comparing this difference to a duration consistency threshold (step 832). This duration consistency threshold corresponds to the expected maximum difference between the average coefficient values for the left and right eye of an alert individual. If the derived difference exceeds the threshold, then there is an indication that the operator is impaired, and in step 834, an indication of such is provided to the impaired operator warning unit. Similar differences can be calculated (steps 836 and 838) and threshold comparisons made (steps 840, 842) for the eyeblink frequency and amplitude derived from the average coefficient values for each eye as described previously. If the differences exceed appropriate frequency and/or amplitude consistency thresholds, this too would be an indication of an impaired operator, and an indication of such is provided to the impaired operator warning unit (steps 844, 846). This consistency determining process is also repeated for each image frame produced subsequent to the respective initial characteristic determination, as long as two actual eye locations are being analyzed.

Figure 10:
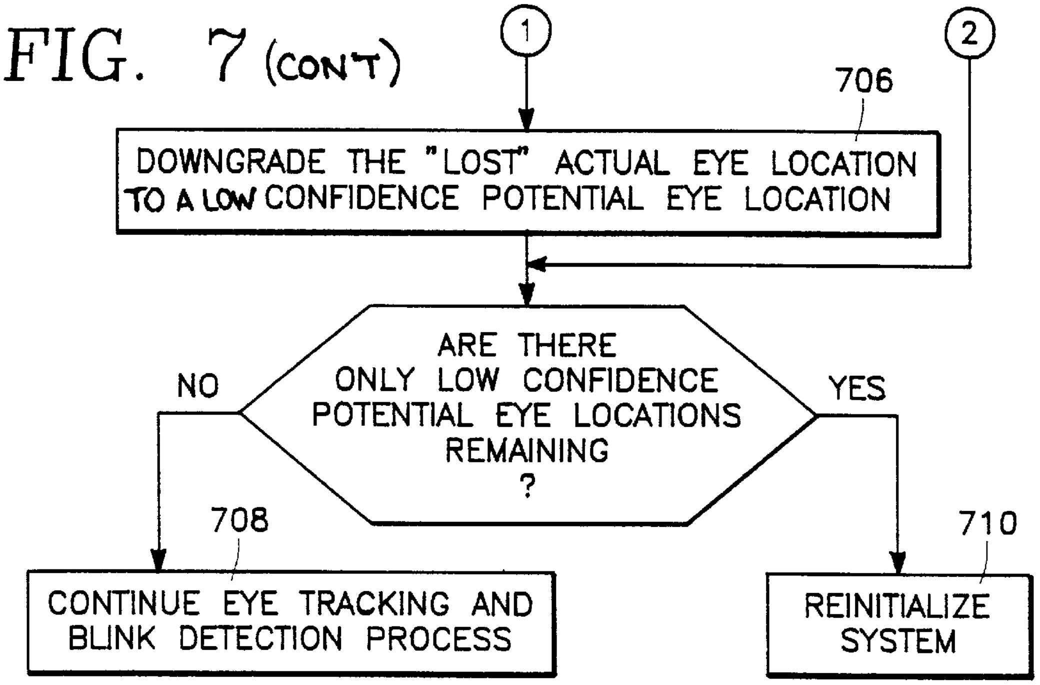
FIGS. 10 is a flow diagram of the preferred process used in the impaired operator warning unit of FIG. 1.
Figure 10:
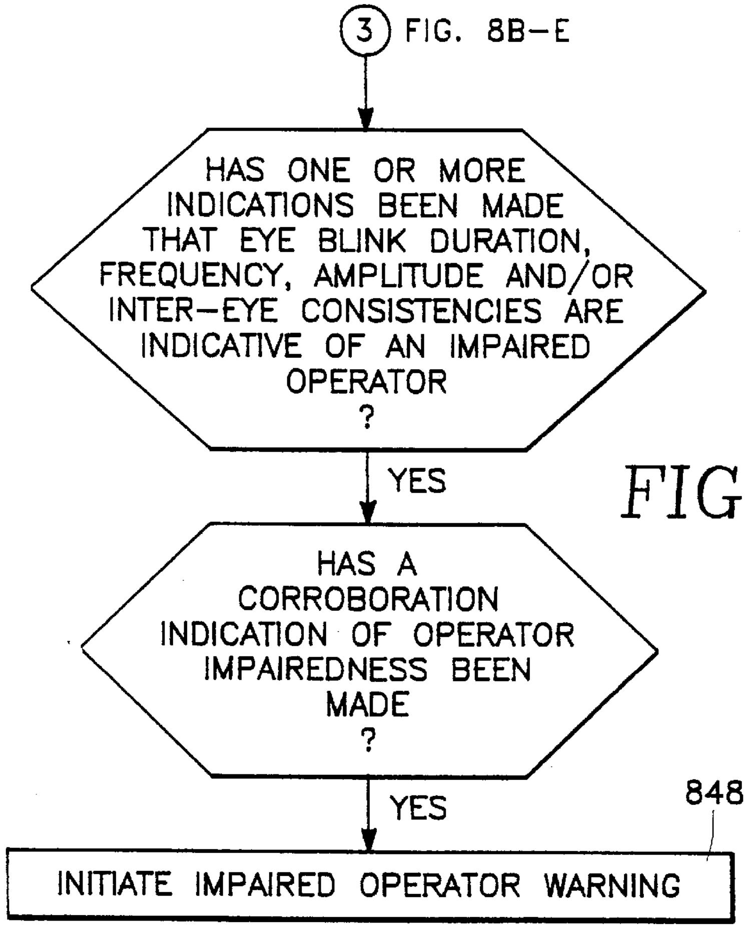

Whenever one or more of the analyzed blink characteristics (i.e. duration, frequency, amplitude, and inter-eye consistencies) indicate that the operator may be impaired, a decision is made as to whether a warning should be initiated by the impaired operator warning unit. A warning could be issued when any one of the analyzed blink characteristics indicates the operator may be impaired. However, the indicators of impairedness when viewed in isolation may not always give an accurate picture of the operator's alertness level. From time to time circumstances other than impairedness might cause the aforementioned characteristic to be exhibited. For example, in the case of an automobile driver, the glare of headlights from an oncoming cars at night might cause a driver to squint thereby affecting his or her eyelid position, blink rate, and other eye-related factors which might result in one or more of the indicators to falsely indicate the driver was impaired. Accordingly, when viewed alone, any one indicator could result in a false determination of operator impairedness. For this reason, it is preferred that other corroborating indications that the operator is impaired be employed. For example, some impaired operator monitoring systems operate by evaluating an operator's control actions. One such example is the disclosed in a co-pending application entitled IMPAIRED OPERATOR DETECTION AND WARNING SYSTEM EMPLOYING ANALYSIS OF OPERATOR CONTROL ACTIONS, having the same assignee as the present application. This co-pending application was filed on Apr. 2, 1997 and assigned serial number 08/832,397 now U.S. Pat. No. 5,798,695. As shown in FIG. 10, when a corroborating impairedness indicator is employed, a warning would not be initiated by the warning unit unless, at least one of the analyzed eyeblink characteristics indicated the operator may be impaired, and the corroborating indicator also indicated impairedness (step 848).

Another way of increasing the confidence that an operator is actually impaired based on an analysis of his or her eyeblinks, would be to require more than one of the aforementioned indicators to point to an impaired operator before initiating a warning. An extreme example would be a requirement that all the impairedness indicators, i.e. blink duration, frequency, amplitude, and inter-eye consistency (if available), indicate the operator is impaired before initiating a warning. Of course, some indicators can be more definite than others, and thus should be given a higher priority. Accordingly, a voting logic could be employed which will assist in the determination whether an operator is impaired, or not. This voting logic could result in an immediate indication of impairedness if a more definite indicator is detected, but require two or more of lesser indicators to be detected before a determination of impairedness is made. The particular indicator or combination of indicators which should be employed to increase the confidence of the system could be determined empirically by analyzing alert and impaired operators in simulated conditions. Additionally, evaluating changes in an indicator over time can be advantageous because temporary effects which affect the accuracy of the detection process, such as the aforementioned example of squinting caused by the glare of oncoming headlights, can be filtered out. For example, if an indicator such as blink duration where determined to indicate an impaired driver over a series of image frames, but then change to indicate and alert driver, this could indicate a temporary skewing factor had been present. Such a problem could be resolved by requiring an indicator to remain in a state indicating impairedness for some minimum amount of time before the operator is deemed impaired and a decision is made to initiate a warning. Here again, the particular time frames can be establish empirically by evaluating operators in simulated conditions. The methods of requiring more than one indicator to indicate impairedness, employing voting logic, and/or evaluating changes in the indicators, can be employed with or without the additional precaution of the aforementioned corroborating "non-eyeblink derived" impairedness indicator.

While the invention has been described in detail by reference to the preferred embodiment described above, it is understood that variations and modifications thereof may be made without departing from the true spirit and scope of the invention.

Wherefore, what is claimed is:

1. A method of detecting an impaired operator, comprising the steps of:

(a) employing an imaging apparatus which produces consecutive digital images including the face and eyes of an operator, each digital image comprising an array of pixel representing the intensity of light reflected from the face of the subject;

(b) determining the location of a first one of the operator's eyes within each digital image;

(c) generating correlation coefficients, each of which quantifies the degree of correspondence between pixels associated with the location of the operator's eye in an immediately preceding image in comparison to pixels associated with the location of the operator's eye in a current image;

(d) averaging the first N consecutive correlation coefficients generated to generate a first average correlation coefficient, wherein N corresponds to at least the number of images required to image a blink of the operator's eye;

(e) after the production of the next image by the imaging apparatus, averaging the previous N consecutive correlation coefficients generated to create a next average correlation coefficient;

(f) repeating step (e) for each image frame produced by the imaging apparatus;

(g) analyzing said average correlation coefficients to extract at least one parameter attributable to an eyeblink of said operator's eye;

(h) comparing each extracted parameter to an alert operator threshold associated with that parameter, said threshold being indicative of an alert operator; and (i) indicating that the operator may be impaired if any extracted parameter deviates from the associated threshold in a prescribed way.

2. The method of claim 1, further comprising the steps of:

(j) determining the location of the other of the operator's eyes within each digital image; and (k) performing steps (c) through (i) for the location of the other of the operator'eyes.

3. The method of claim 1, wherein:

the analyzing step comprises extracting a parameter indicative of the duration of an operator's eyeblinks;

the comparing step comprises comparing the extracted duration parameter to said associated alert operator threshold wherein the threshold corresponds to a maximum eyeblink duration expected to be exhibited by an alert operator's eye; and the indicating step comprises indicating the operator may be impaired whenever the extracted duration parameter exceeds the alert operator duration threshold.

4. The method of claim 3, wherein:

the step of extracting the duration parameter comprises identifying each average correlation coefficient generated;

the step of comparing the extracted duration parameter to said associated alert operator duration threshold comprises comparing each average correlation coefficient to a minimum average correlation coefficient value which is would be obtained by averaging the correlation coefficients generated for N images capturing a complete blink of an alert operator's eye; and wherein, the extracted duration parameter exceeds the alert operator threshold whenever the average correlation coefficients are less than the minimum average correlation coefficient value which is would be obtained by averaging the correlation coefficients generated for N images capturing a complete blink of an alert operator's eye.

5. The method of claim 1, wherein:

the analyzing step comprises extracting a parameter indicative of the frequency of an operator's eyeblinks;

the comparing step comprises comparing the extracted frequency parameter to said associated alert operator threshold wherein the threshold corresponds to a minimum eyeblink frequency expected to be exhibited by an alert operator's eye; and the indicating step comprises indicating the operator may be impaired whenever the extracted frequency parameter is less than the alert operator frequency threshold.

6. The method of claim 1, wherein the step of extracting the frequency parameter comprises the steps of counting the number of minimum average correlation coefficients occurring over a prescribed preceding period of time which are less than a prescribed value, and thereafter dividing the counted number of minimum average correlation coefficients by the prescribed period of time to determine an eyeblink frequency, wherein said prescribed value corresponds a maximum average correlation coefficient value which is would be obtained by averaging the correlation coefficients generated for N images capturing a complete blink of an alert operator's eye, said analyzing step being repeated each time an average correlation coefficient is generated.

7. The method of claim 1, wherein:

the analyzing step comprises extracting a parameter indicative of the amplitude of an operator's eyeblinks;

the comparing step comprises comparing the extracted amplitude parameter to said associated alert operator threshold wherein the threshold corresponds to a minimum eyeblink amplitude expected to be exhibited by an alert operator's eye; and the indicating step comprises indicating the operator may be impaired whenever the extracted amplitude parameter is less than the alert operator amplitude threshold.

8. The method of claim 1, wherein the step of extracting the amplitude parameter comprises the steps of identifying each occurrence of a minimum average correlation coefficient which is less than a prescribed value and for each such occurrence determining the absolute value of the difference between the minimum average correlation coefficient and the next occurring maximum average correlation coefficient, wherein said absolute value is indicative of the amplitude of an operator's eyeblink, and wherein said prescribed value corresponds a maximum average correlation coefficient value which is would be obtained by averaging the correlation coefficients generated for N images capturing a complete blink of an alert operator's eye.

9. The method of claim 2, wherein the comparing step comprises first determining the difference between an extracted parameter associated with the first eye and a like extracted parameter associated with the other eye to establish a parameter consistency factor for the extracted parameter, and thereafter comparing the established parameter consistency factor to an alert operator consistency threshold associated with that parameter.

10. The method of claim 9, wherein:

the analyzing step comprises extracting a parameter indicative of the duration of an operator's eyeblinks;

the comparing step comprises determining the difference between the duration of each of the operator's eyeblinks associated with the first eye to the duration of a next occurring eyeblink associated with the other eye to establish a duration consistency factor, and thereafter comparing the determined duration consistency factor to said associated alert operator consistency threshold wherein the threshold corresponds to a minimum difference in the eyeblink duration expected to be exhibited by an alert operator's eyes; and the indicating step comprises indicating that the operator may be impaired whenever the determined duration consistency factor exceeds the associated alert operator duration consistency threshold.

11. The method of claim 9, wherein:

the analyzing step comprises extracting parameters indicative of the frequency of an operator's eyeblinks;

the comparing step comprises determining the difference between the frequency of the operator's eyeblinks associated with the first eye as calculated over a prescribed period of time to the contemporaneous frequency of the eyeblinks associated with the other eye as calculated for the prescribed period of time to establish a frequency consistency factor, and thereafter comparing the determined frequency consistency factor to said associated alert operator consistency threshold wherein the threshold corresponds to a minimum difference in the eyeblink frequency expected to be exhibited by an alert operator's eyes; and the indicating step comprises indicating that the operator may be impaired whenever the determined frequency consistency factor exceeds the alert operator frequency consistency threshold.

12. The method of claim 9, wherein:

the analyzing step comprises extracting parameters indicative of the amplitude of an operator's eyeblinks;

the comparing step comprises determining the difference between the amplitude of each of the operator's eyeblinks associated with the first eye to the completeness of the next occurring eyeblink associated with the other eye to establish a amplitude consistency factor, and thereafter comparing the determined amplitude consistency factor to said associated alert operator consistency threshold wherein the threshold corresponds to a minimum difference in the amplitude of eyeblinks expected to be exhibited by an alert operator's eyes; and the indicating step comprises indicating that the operator may be impaired whenever the determined amplitude consistency factor exceeds the alert operator amplitude consistency threshold.

13. The method of claim 2, wherein plural parameters attributable to an eyeblink of said operator's eye are extracted, and wherein:

the analyzing step comprises extracting parameters indicative of the duration, frequency, and amplitude of an operator's eyeblinks;

the comparing step further comprises:

comparing the extracted duration parameter to an alert operator duration threshold wherein the duration threshold corresponds to a maximum eyeblink duration expected to be exhibited by an alert operator's eye, comparing the extracted frequency parameter to an alert operator frequency threshold wherein the frequency threshold corresponds to a minimum eyeblink frequency expected to be exhibited by an alert operator's eye, comparing the extracted amplitude parameter to an alert operator amplitude threshold wherein the amplitude corresponds to a minimum eyeblink amplitude expected to be exhibited by an alert operator's eye, and determining the difference between at least one of the extracted parameters associated with the first eye and a like extracted parameter associated with the other eye to establish a consistency factor for the extracted parameter, and thereafter comparing the established parameter consistency factor to an alert operator consistency threshold associated with that parameter.

14. The method of claim 13, wherein the indicating step comprises indicating the operator may be impaired whenever at least one of (1) the extracted duration parameter exceeds the alert operator duration threshold, (2) the extracted frequency parameter is less than the alert operator frequency threshold, (3) the extracted amplitude parameter is less than the alert operator amplitude threshold, and (4) an established parameter consistency factor exceeds an associated alert operator consistency threshold.

15. The method of claim 1, further comprising the step of:

(j) generating a corroborating indicator of operator impairedness whenever operator control inputs are indicative of the operator being impaired; and (k) indicating that the operator is impaired if at least one of the extracted parameter deviates from the associated threshold in a prescribed way, and the corroborating indicator is generated.

16. An impaired operator detection and warning system, comprising:

an imaging apparatus which produces consecutive digital images including the face and eyes of an operator, each digital image comprising an array of pixel representing the intensity of light reflected from the face of the subject;

an eye finding unit comprising an eye finding processor, said eye finding processor comprising:

a first processor portion capable of determining the location of a first one of the operator's eyes within each digital image, a second processor portion capable of generating correlation coefficients each of which quantifies the degree of correspondence between pixels associated with the location of the operator's eye in an immediately preceding image in comparison to pixels associated with the location of the operator's eye in a current image;

an impaired operator detection unit comprising an impaired operator detection processor, said impaired operator detection processor comprising:

a first processor portion capable of averaging the first N consecutive correlation coefficients generated to generate a first average correlation coefficient, wherein N corresponds to at least the number of images required to image a blink of the operator's eye, a second processor portion capable of, after the production of the next image by the imaging apparatus, averaging the previous N consecutive correlation coefficients generated to create a next average correlation coefficient, and repeating the averaging for each image frame produced by the imaging apparatus, a third processor portion capable of analyzing said average correlation coefficients to extract at least one parameter attributable to an eyeblink of said operator's eye, a fourth processor portion capable of comparing each extracted parameter to an alert operator threshold associated with that parameter, said threshold being indicative of an alert operator; and an impaired operator warning unit comprising an impaired operator warning processor, said impaired operator warning processor capable of indicating that the operator may be impaired if any extracted parameter deviates from the associated threshold in a prescribed way.

17. The system of claim 16, wherein:

the third processor portion of the impaired operator detection processor is capable of extracting a parameter indicative of the duration of an operator's eyeblinks;

the fourth processor portion of the impaired operator detection processor is capable of comparing the extracted duration parameter to said associated alert operator threshold wherein the threshold corresponds to a maximum eyeblink duration expected to be exhibited by an alert operator's eye; and the impaired operator warning processor is capable of indicating the operator may be impaired whenever the extracted duration parameter exceeds the alert operator duration threshold.

18. The system of claim 16, wherein:

the third processor portion of the impaired operator detection processor is capable of extracting a parameter indicative of the frequency of an operator's eyeblinks;

the fourth processor portion of the impaired operator detection processor is capable of comparing the extracted frequency parameter to said associated alert operator threshold wherein the threshold corresponds to a minimum eyeblink frequency expected to be exhibited by an alert operator's eye; and the impaired operator warning processor is capable of indicating the operator may be impaired whenever the extracted frequency parameter is less than the alert operator frequency threshold.

19. The system of claim 16, wherein:

the third processor portion of the impaired operator detection processor is capable of extracting a parameter indicative of the amplitude of an operator's eyeblinks;

the fourth processor portion of the impaired operator detection processor is capable of comparing the extracted amplitude parameter to said associated alert operator threshold wherein the threshold corresponds to a minimum eyeblink amplitude expected to be exhibited by an alert operator's eye; and the impaired operator warning processor is capable of indicating the operator may be impaired whenever the extracted amplitude parameter is less than the alert operator amplitude threshold.

20. The system of claim 16, wherein:

the first processor portion of the eye finding processor is further capable of determining the location of an other one of the operator's eyes within each digital image;

the second processor portion of the eye finding processor is further capable of generating correlation coefficients each of which quantifies the degree of correspondence between pixels associated with the location of the operator's other eye in an immediately preceding image in comparison to pixels associated with the location of the operator's other eye in a current image;

the first processor portion of the impaired operator detection processor is further capable of averaging the first N consecutive correlation coefficients generated to generate a first average correlation coefficient associated with the operator's other eye, wherein N corresponds to at least the number of images required to image a blink of the operator's other eye, the second processor portion of the impaired operator detection processor is further capable of, after the production of the next image by the imaging apparatus, averaging the previous N consecutive correlation coefficients generated and associated with the operator's other eye, to create a next average correlation coefficient associated with the operator's other eye, and repeating the averaging for each image frame produced by the imaging apparatus, the third processor portion of the impaired operator detection processor is further capable of analyzing said average correlation coefficients associated with the operator's other eye to extract at least one parameter attributable to an eyeblink of said operator's other eye, the fourth processor portion of the impaired operator detection processor is further capable of comparing each extracted parameter associated with the operator's other eye to an alert operator threshold associated with that parameter, said threshold being indicative of an alert operator;

the impaired operator warning processor is further capable of indicating that the operator may be impaired if any extracted parameter associated with the operator's other eye deviates from the associated threshold in a prescribed way.

21. The system of claim 20, wherein the fourth processor portion of the impaired operator detection processor is further capable of first determining the difference between an extracted parameter associated with the operator's first eye and a like extracted parameter associated with the operator's other eye to establish a parameter consistency factor for the extracted parameter, and thereafter comparing the established parameter consistency factor to an alert operator consistency threshold associated with that parameter.

22. The system of claim 21, wherein:

the third processor portion of the impaired operator detection processor is further capable of extracting a parameter indicative of the duration of an operator's eyeblinks;

the fourth processor portion of the impaired operator detection processor is further capable of determining the difference between the duration of each of the operator's eyeblinks associated with the first eye to the duration of a next occurring eyeblink associated with the other eye to establish a duration consistency factor, and thereafter comparing the determined duration consistency factor to said associated alert operator consistency threshold wherein the threshold corresponds to a minimum difference in the eyeblink duration expected to be exhibited by an alert operator's eyes; and the impaired operator warning processor is further capable of indicating that the operator may be impaired whenever the determined duration consistency factor exceeds the associated alert operator duration consistency threshold.

23. The system of claim 21, wherein:

the third processor portion of the impaired operator detection processor is further capable of extracting parameters indicative of the frequency of an operator's eyeblinks;

the fourth processor portion of the impaired operator detection processor is further capable of determining the difference between the frequency of the operator's eyeblinks associated with the first eye as calculated over a prescribed period of time to the contemporaneous frequency of the eyeblinks associated with the other eye as calculated for the prescribed period of time to establish a frequency consistency factor, and thereafter comparing the determined frequency consistency factor to said associated alert operator consistency threshold wherein the threshold corresponds to a minimum difference in the eyeblink frequency expected to be exhibited by an alert operator's eyes; and the impaired operator warning processor is further capable of indicating that the operator may be impaired whenever the determined frequency consistency factor exceeds the alert operator frequency consistency threshold.

24. The system of claim 21, wherein:

the third processor portion of the impaired operator detection processor is further capable of extracting parameters indicative of the amplitude of an operator's eyeblinks;

the fourth processor portion of the impaired operator detection processor is further capable of determining the difference between the amplitude of each of the operator's eyeblinks associated with the first eye to the completeness of the next occurring eyeblink associated with the other eye to establish a amplitude consistency factor, and thereafter comparing the determined amplitude consistency factor to said associated alert operator consistency threshold wherein the threshold corresponds to a minimum difference in the amplitude of eyeblinks expected to be exhibited by an alert operator's eyes; and the impaired operator warning processor is further capable of indicating that the operator may be impaired whenever the determined amplitude consistency factor exceeds the alert operator amplitude consistency threshold.

25. The system of claim 20, wherein plural parameters attributable to an eyeblink of said operator's eyes are extracted, and wherein:

the third processor portion of the impaired operator detection processor is further capable of extracting parameters indicative of the duration, frequency, and amplitude of an operator's eyeblinks;

the fourth processor portion of the impaired operator detection processor is further capable of:

comparing each extracted duration parameter associated with the operator's eyes to an alert operator duration threshold wherein the duration threshold corresponds to a maximum eyeblink duration expected to be exhibited by an alert operator's eyes, comparing each extracted frequency parameter associated with the operator's eyes to an alert operator frequency threshold wherein the frequency threshold corresponds to a minimum eyeblink frequency expected to be exhibited by an alert operator's eyes, comparing each extracted amplitude parameter associated with the operator's eyes to an alert operator amplitude threshold wherein the amplitude corresponds to a minimum eyeblink amplitude expected to be exhibited by an alert operator's eyes, and determining the difference between at least one of the extracted parameters associated with the first eye and a like extracted parameter associated with the other eye to establish a consistency factor for the extracted parameter, and thereafter comparing the established parameter consistency factor to an alert operator consistency threshold associated with that parameter.

26. The system of claim 25, wherein the impaired operator warning processor is further capable of indicating the operator may be impaired whenever at least one of (1) any extracted duration parameter exceeds the alert operator duration threshold, (2) any extracted frequency parameter is less than the alert operator frequency threshold, (3) any extracted amplitude parameter is less than the alert operator amplitude threshold, and (4) an established parameter consistency factor exceeds an associated alert operator consistency threshold.

27. The system of claim 16, further comprising:

a corroborating operator alertness indicator unit capable of generating a corroborating indicator of operator impairedness whenever operator control inputs are indicative of the operator being impaired; and wherein the impaired operator warning processor indicates that the operator is impaired whenever at least one of the extracted parameter deviates from the associated threshold in a prescribed way, and the corroborating indicator is generated.

* * * * *